(12) United States Patent
Kim

(10) Patent No.: US 12,145,561 B2
(45) Date of Patent: Nov. 19, 2024

(54) ELECTRONIC BRAKE SYSTEM AND METHOD FOR OPERATING SAME

(71) Applicant: HL MANDO CORPORATION, Gyeonggi-do (KR)

(72) Inventor: Jin Seok Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 852 days.

(21) Appl. No.: 17/296,235

(22) PCT Filed: Nov. 22, 2019

(86) PCT No.: PCT/KR2019/016184
§ 371 (c)(1),
(2) Date: May 22, 2021

(87) PCT Pub. No.: WO2020/106114
PCT Pub. Date: May 28, 2020

(65) Prior Publication Data

US 2022/0017052 A1  Jan. 20, 2022

(30) Foreign Application Priority Data

Nov. 22, 2018 (KR) ........................ 10-2018-0145511

(51) Int. Cl.
*B60T 8/32* (2006.01)
*B60T 8/40* (2006.01)
(Continued)

(52) U.S. Cl.
CPC ............ *B60T 8/326* (2013.01); *B60T 8/4081* (2013.01); *B60T 13/142* (2013.01); *B60T 13/62* (2013.01);
(Continued)

(58) Field of Classification Search
CPC .... B60T 8/4081; B60T 13/686; B60T 13/142; B60T 2270/402; B60T 13/168;
(Continued)

(56) References Cited

U.S. PATENT DOCUMENTS 8,915,338 B2   12/2014  Murayama et al.
10,442,416 B2 * 10/2019  Jung ..................... B60T 13/686
(Continued)

FOREIGN PATENT DOCUMENTS

CN          203864681        10/2014
DE       10 2018 204 641      9/2018
(Continued)

OTHER PUBLICATIONS

Office Action dated May 24, 2023 for Korean Patent Application No. 10-2018-0145511 and its English translation provided by the Applicant's foreign counsel.
(Continued)

*Primary Examiner* — Robert A. Siconolfi
*Assistant Examiner* — Mahbubur Rashid
(74) *Attorney, Agent, or Firm* — Womble Bond Dickinson (US) LLP

(57) ABSTRACT

The present disclosure relates to an electronic brake system and an operation method thereof. The electronic brake system includes a reservoir in which a pressurized medium is stored, an integrated master cylinder including a simulation piston, a master piston, and an elastic member provided between the simulation piston and the master piston, a reservoir flow path to connect the integrated master cylinder and the reservoir, a hydraulic pressure supply device configured to generate a hydraulic pressure by operating a hydraulic piston according to an electrical signal output in response to a displacement of a brake pedal, a hydraulic control unit including a first hydraulic circuit having two
(Continued)

wheel cylinders and a second hydraulic circuit having the other two wheel cylinders and configured to control the hydraulic pressure transferred to the first hydraulic circuit and the second hydraulic circuit, and an electronic control unit configured to control valves based on hydraulic pressure information and displacement information of the brake pedal.

14 Claims, 11 Drawing Sheets

(51) Int. Cl.
  *B60T 13/14* (2006.01)
  *B60T 13/62* (2006.01)
  *B60T 13/68* (2006.01)
  *B60T 15/02* (2006.01)
  *B60T 17/04* (2006.01)
(52) U.S. Cl.
  CPC .......... *B60T 13/686* (2013.01); *B60T 15/028* (2013.01); *B60T 17/04* (2013.01); *B60T 2270/402* (2013.01); *B60T 2270/404* (2013.01); *B60T 2270/82* (2013.01)
(58) Field of Classification Search
  CPC ...... B60T 13/148; B60T 8/368; B60T 13/165; B60T 8/326; B60T 13/62; B60T 15/028; B60T 17/04; B60T 2270/404; B60T 2270/82
  See application file for complete search history.

(56) References Cited

U.S. PATENT DOCUMENTS

| 2013/0239566 | A1 | 9/2013 | Kim et al. |
| 2017/0144642 | A1 | 5/2017 | Kim et al. |
| 2018/0273008 | A1* | 9/2018 | Kim .................. B60T 13/58 |

FOREIGN PATENT DOCUMENTS

| JP | 2007-238095 | 9/2007 |
| JP | 2013-184632 | 9/2013 |
| KR | 10-2013-0092045 | 8/2013 |
| KR | 10-2014-0135043 | 11/2014 |

OTHER PUBLICATIONS

International Search Report for PCT/KR2019/016184 mailed on Mar. 23, 2020 and its English translation from WIPO (now published as WO 2020/106114).
Written Opinion of the International Searching Authority for PCT/KR2019/016184 mailed on Mar. 23, 2020 and its English translation from WIPO (now published as WO 2020/106114).
Extended European Search Report for European Patent Application No. 19887339.0 dated Jul. 4, 2022.
International Preliminary Report on Patentability (Chapter I) for PCT/KR2019/016184 issued on May 25, 2021 and its English translation from WIPO (published as WO 2020/106114).

* cited by examiner

[Fig. 1]
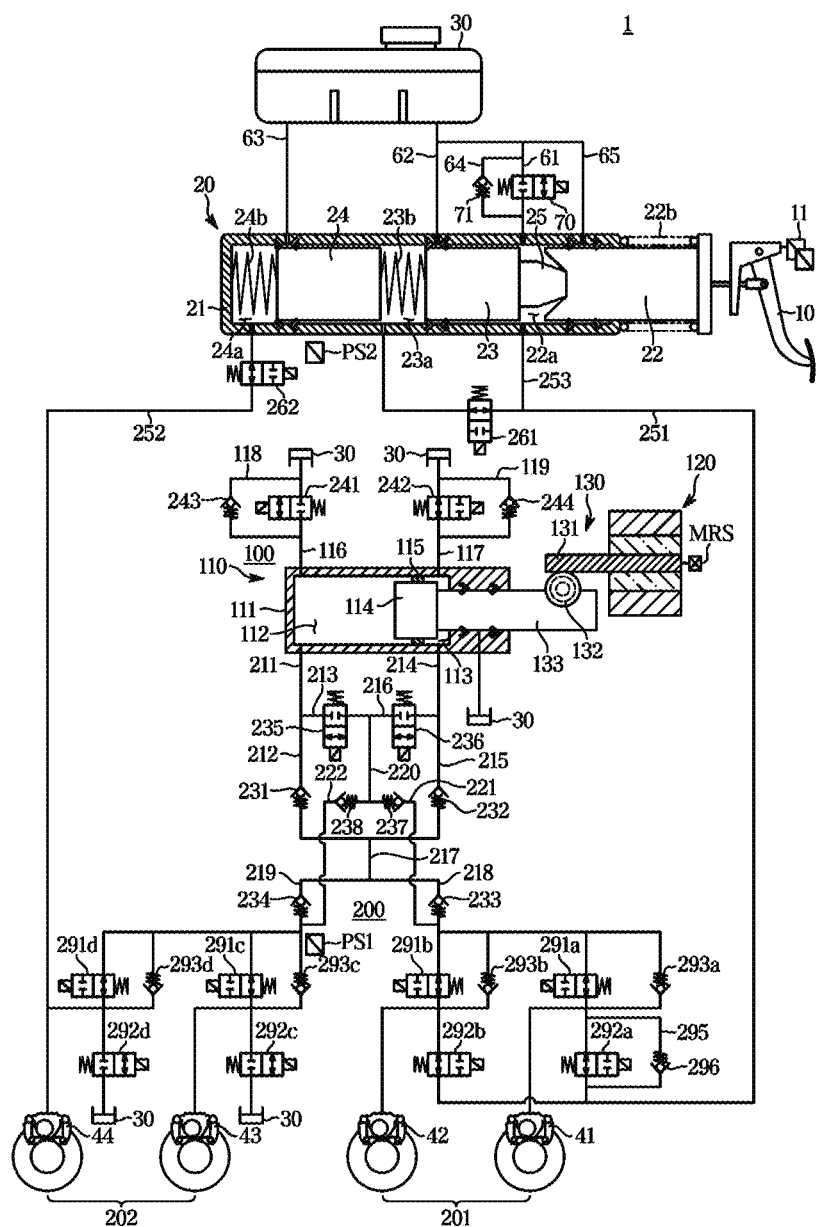

[Fig. 2]
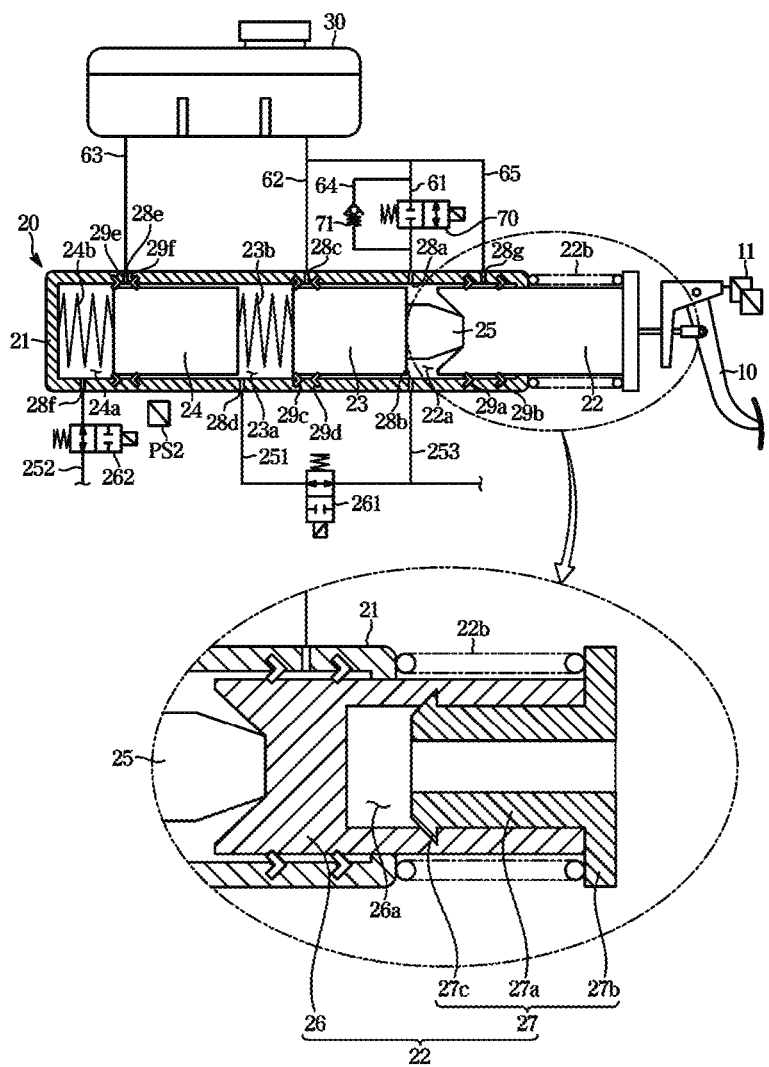

[Fig. 3]
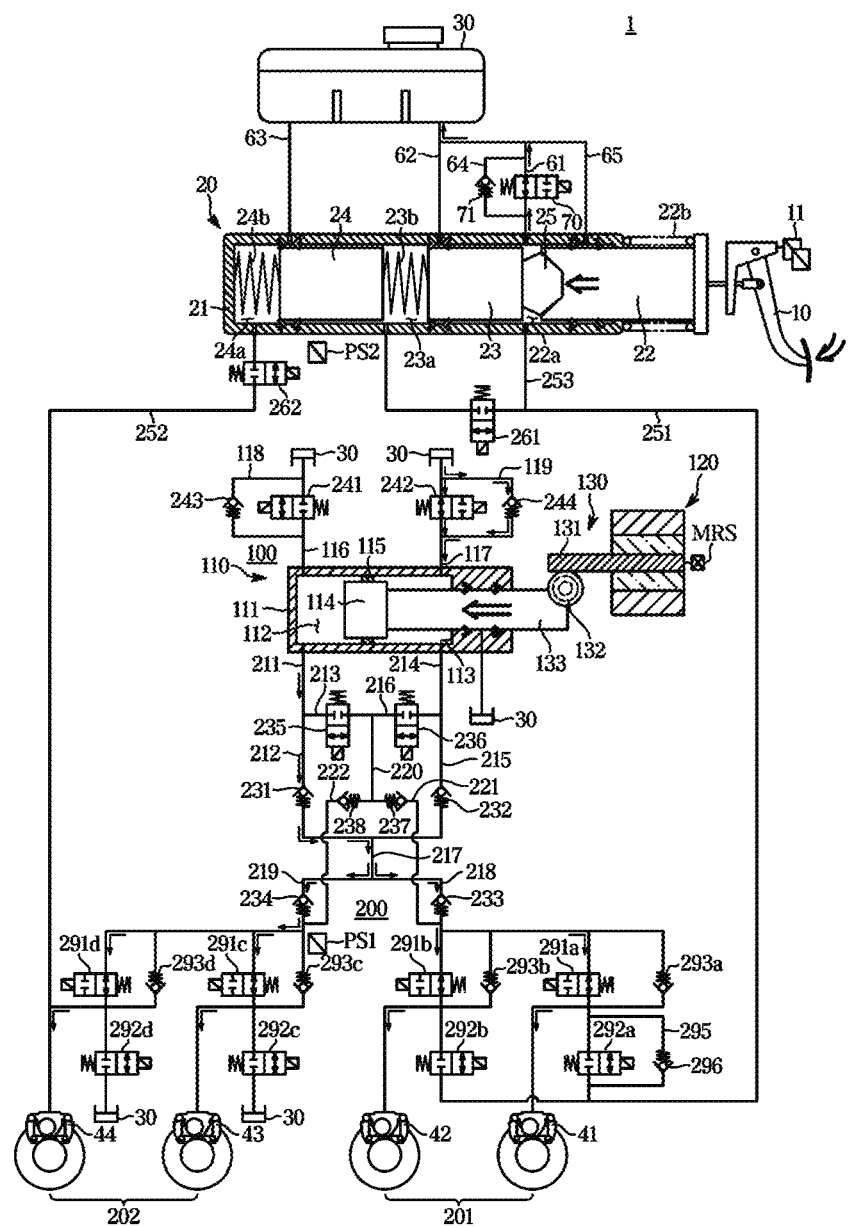

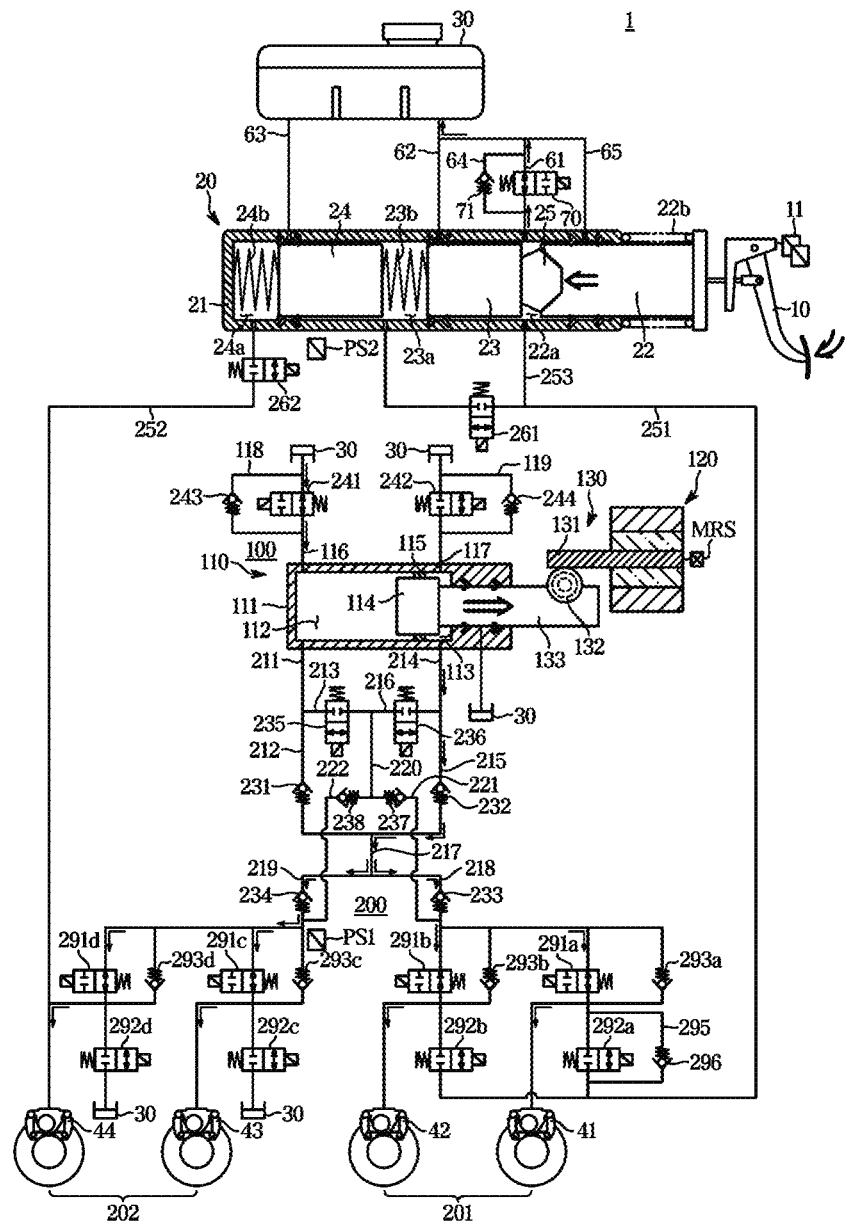
[Fig. 4]

[Fig. 5]
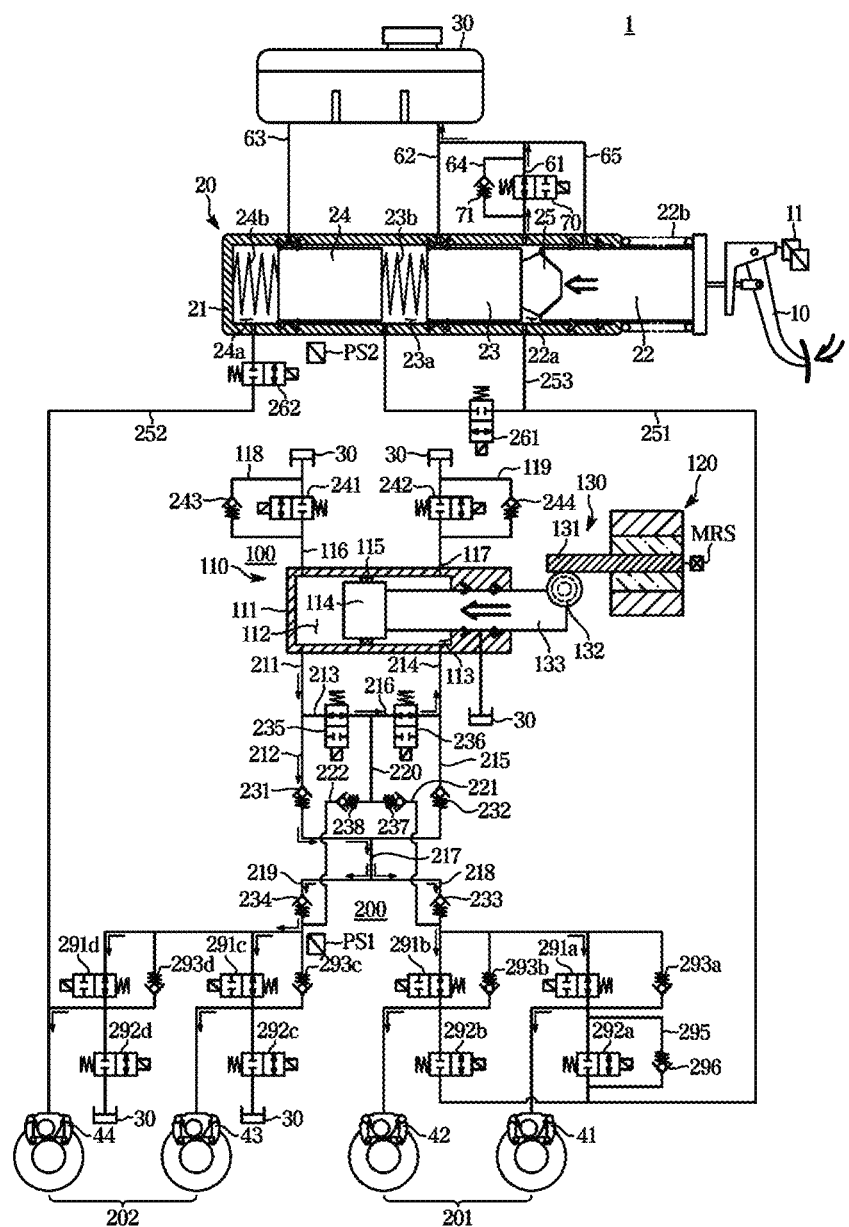

[Fig. 6]
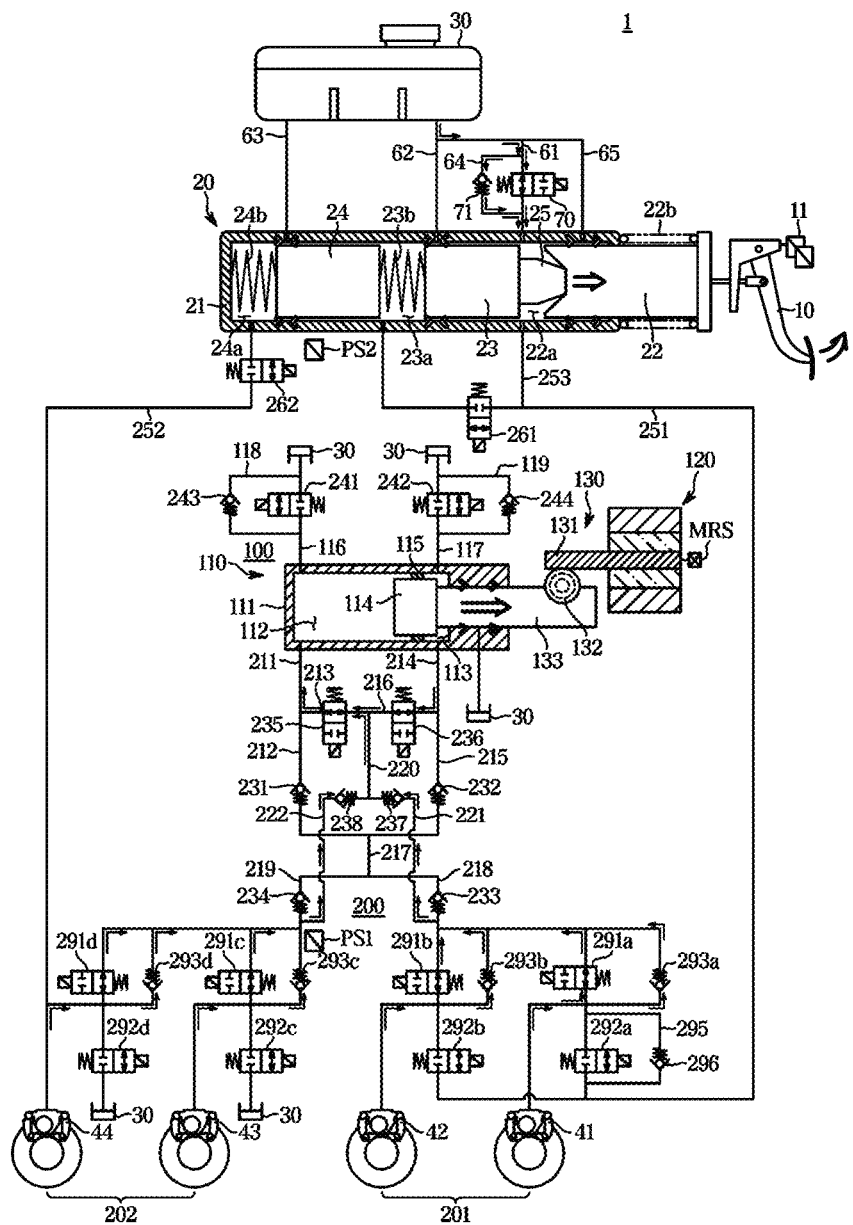

[Fig. 7]
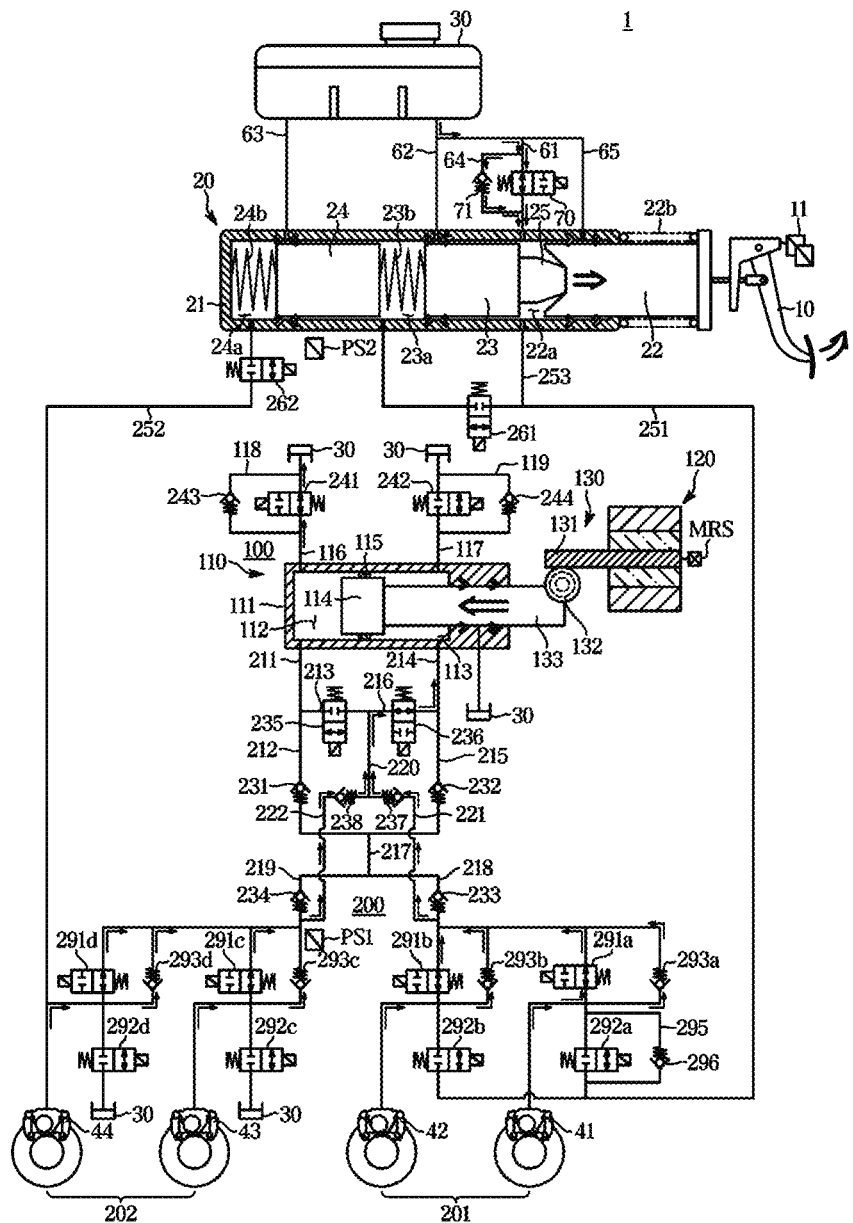

[Fig. 8]
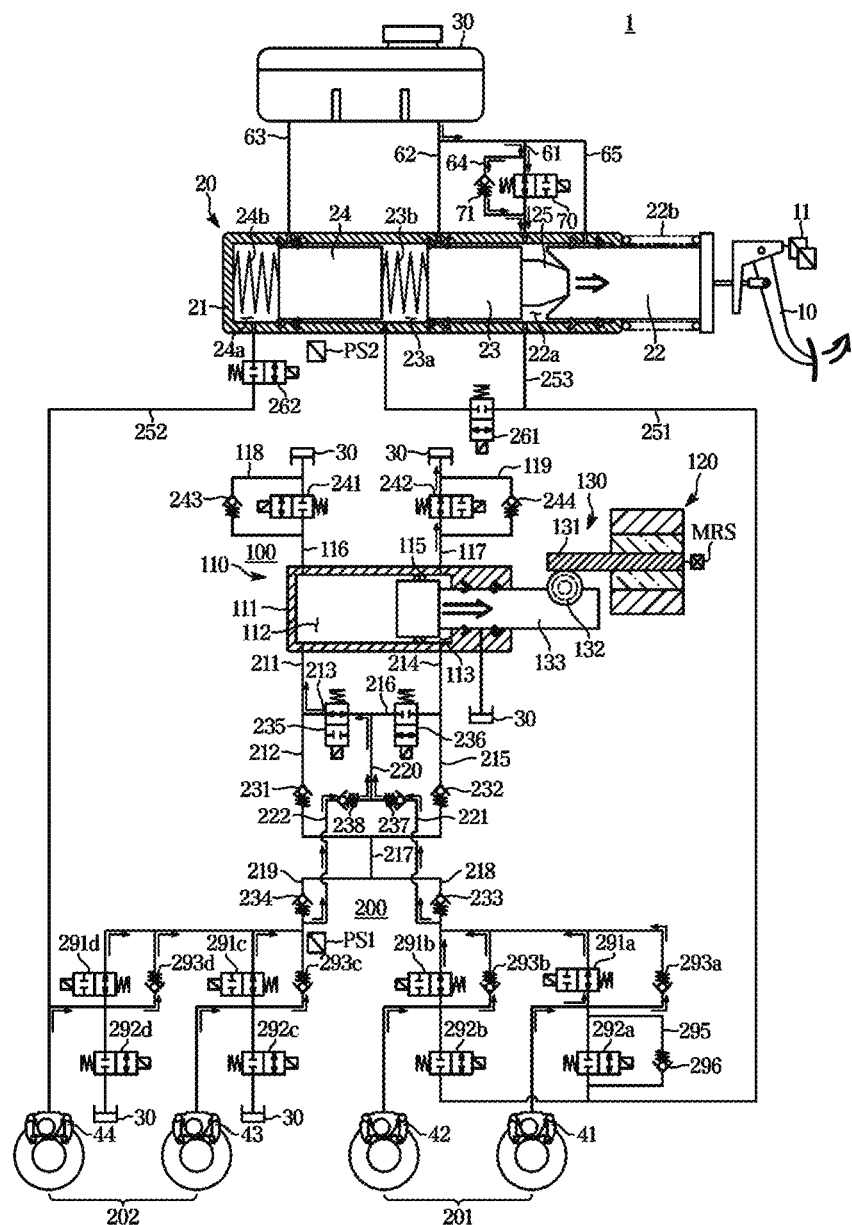

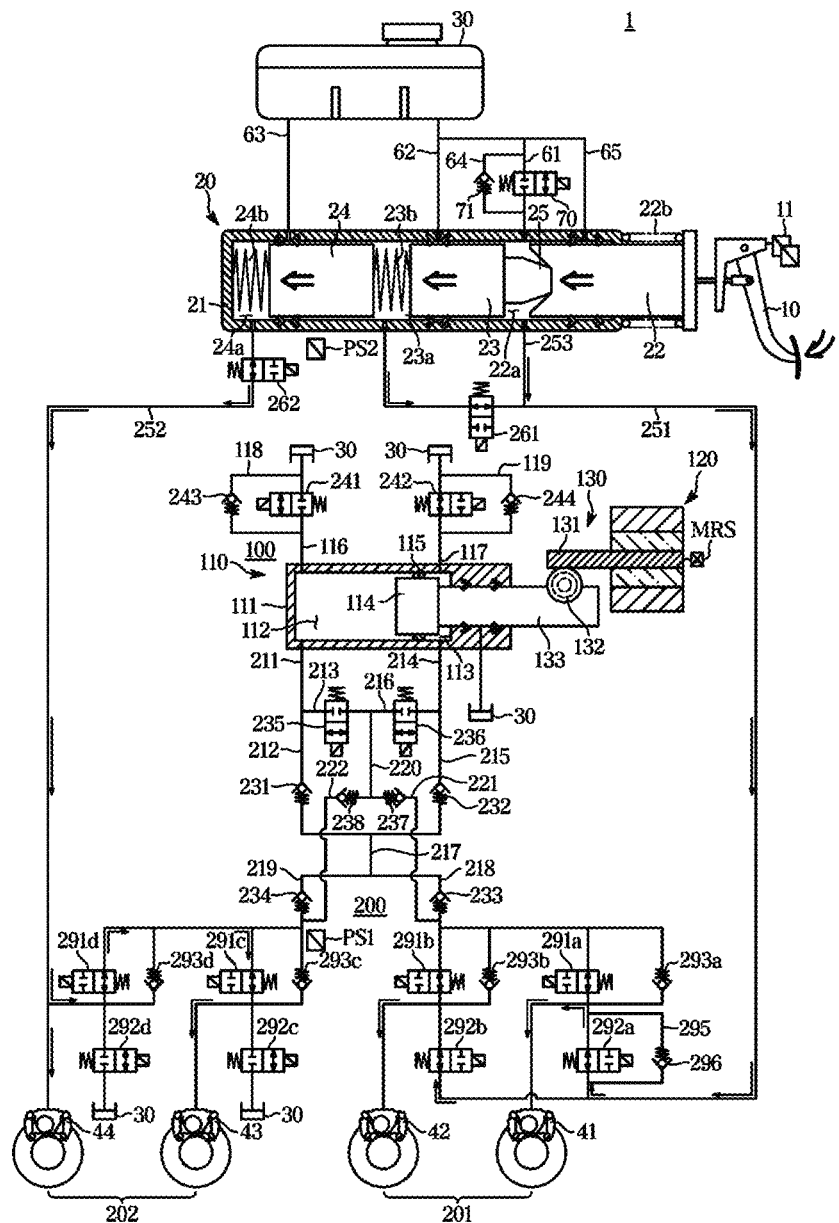
[Fig. 9]

[Fig. 10]
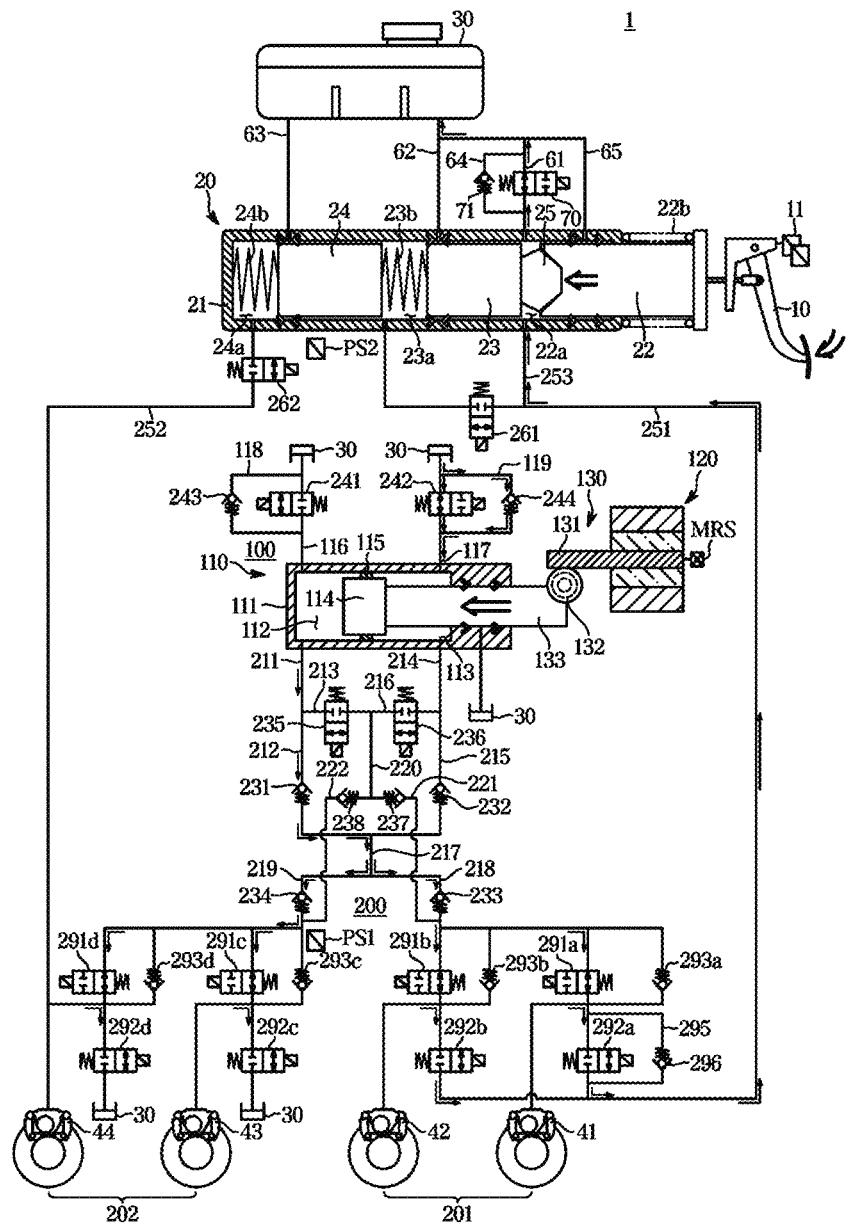

[Fig. 11]
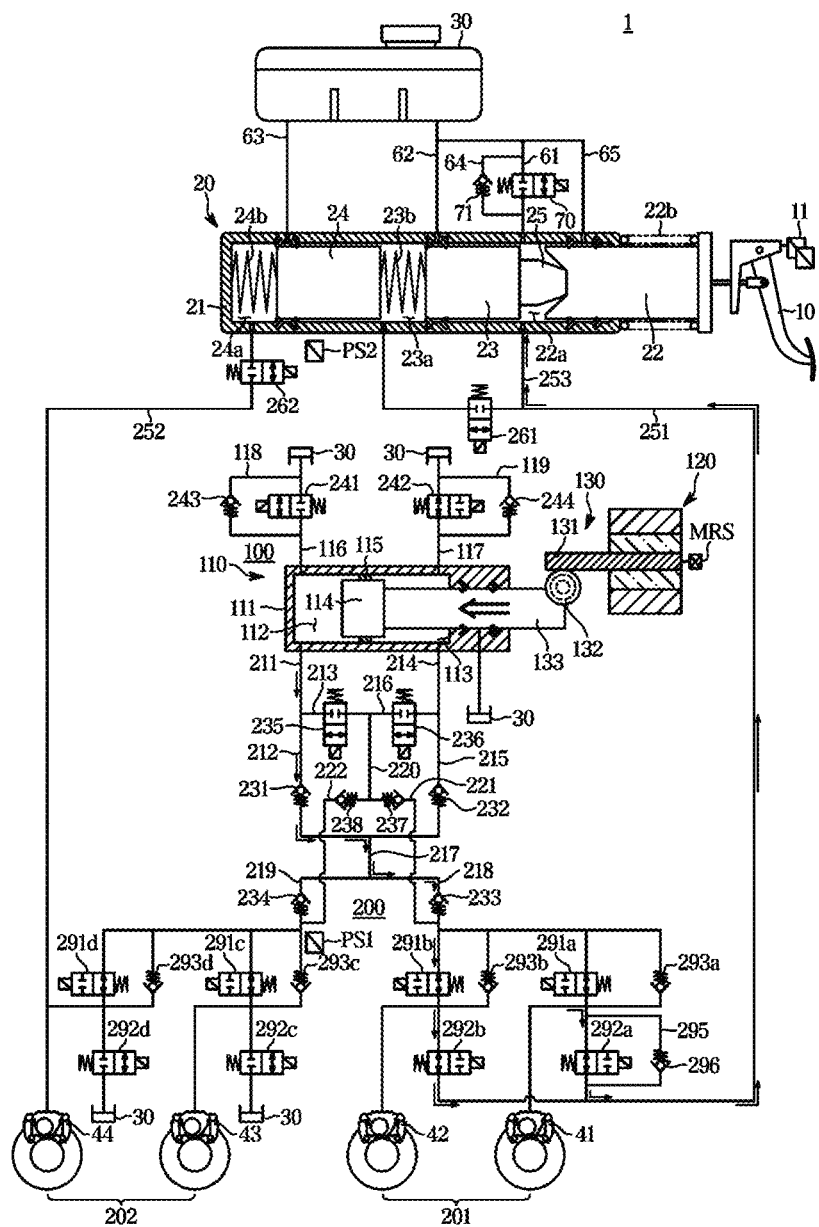

ELECTRONIC BRAKE SYSTEM AND METHOD FOR OPERATING SAME

CROSS-REFERENCE TO RELATED APPLICATIONS

This application is the U.S. National Stage of International Patent Application No. PCT/KR2019/016184 filed on Nov. 22, 2019, which claims the priority to Korean Patent Application No. 10-2018-0145511 filed in the Korean Intellectual Property Office on Nov. 22, 2018, the entire contents of which are incorporated herein by reference.

TECHNICAL FIELD

The present disclosure relates to an electronic brake system and an operation method thereof, and more particularly, to an electronic brake system and an operation method thereof for generating a braking force using an electrical signal corresponding to a displacement of a brake pedal.

BACKGROUND ART

Vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system and an operation method thereof, which include a hydraulic pressure supply device that receives an electrical signal corresponding to a pressing force of a driver from a pedal displacement sensor that detects a displacement of a brake pedal when the driver depresses the brake pedal and supplies a hydraulic pressure required for braking to wheel cylinders, have been widely used.

In such an electronic brake system and an operation method thereof, an electrical signal is generated and provided when a driver depresses the brake pedal in a normal operation mode, and based on this, the hydraulic pressure supply device is electrically operated and controlled to generate a hydraulic pressure required for braking and transfer the hydraulic pressure to the wheel cylinders. Although such an electronic brake system and operation method are electrically operated and controlled so that complex and various braking operations may be implemented, when a technical problem occurs in an electric component, a hydraulic pressure required for braking may not be stably generated, and thus the safety of passengers may not be secured. Therefore, the electronic brake system and operation method thereof enters an abnormal operation mode when a component fails or becomes out of control, and in this case, a mechanism is required in which the operation of the brake pedal by the driver is directly linked to the wheel cylinders. That is, in the abnormal operation mode in the electronic brake system and operation method thereof, as the driver depresses the brake pedal, a pressure required for braking needs to be generated immediately and transferred directly to the wheel cylinders.

DISCLOSURE

Technical Problem

The present disclosure is directed to providing an electronic brake system and an operation method thereof capable of reducing the number of components and implementing product miniaturization and weight reduction by integrating a master cylinder and a simulation apparatus into one.

The present disclosure is directed to providing an electronic brake system and an operation method thereof capable of implementing stable and effective braking even in various operating situations.

The present disclosure is directed to providing an electronic brake system and an operation method thereof capable of stably generating a high braking pressure.

The present disclosure is directed to providing an electronic brake system and an operation method thereof capable of improving performance and operational reliability.

The present disclosure is directed to providing an electronic brake system and an operation method thereof capable of implementing easy assembly of a product, improving productivity of the product and reducing a manufacturing cost of the product.

Technical Solution

An aspect of the present disclosure provides an electronic brake system including a reservoir in which a pressurized medium is stored, an integrated master cylinder having a master chamber and a simulation chamber in which volumes thereof are varied depending on a displacement of a brake pedal, a hydraulic pressure supply device configured to generate a hydraulic pressure by operating a hydraulic piston according to an electrical signal output in response to the displacement of the brake pedal and having a first pressure chamber formed on one side of the hydraulic piston and a second pressure chamber formed on the other side of the hydraulic piston, and a hydraulic control unit including a first hydraulic circuit having two wheel cylinders and a second hydraulic circuit having the other two wheel cylinders and configured to control the hydraulic pressure transferred to the first hydraulic circuit and the second hydraulic circuit, wherein the hydraulic control unit includes a first hydraulic flow path connected to the first pressure chamber, a second hydraulic flow path and a third hydraulic flow path branched from the first hydraulic flow path, a fourth hydraulic flow path connected to the second pressure chamber, a fifth hydraulic flow path and a sixth hydraulic flow path branched from the fourth hydraulic flow path, a seventh hydraulic flow path in which the second hydraulic flow path and the fifth hydraulic flow path join, an eighth hydraulic flow path branched from the seventh hydraulic flow path and connected to the first hydraulic circuit, a ninth hydraulic flow path branched from the seventh hydraulic flow path and connected to the second hydraulic circuit, a tenth hydraulic flow path in which the third hydraulic flow path and the sixth hydraulic flow path join, an eleventh hydraulic flow path branched from the tenth hydraulic flow path and connected to the first hydraulic circuit, and a twelfth hydraulic flow path branched from the tenth hydraulic flow path and connected to the second hydraulic circuit.

The hydraulic control unit may further include a first valve provided in the second hydraulic flow path to control the flow of the pressurized medium, a second valve provided in the fifth hydraulic flow path to control the flow of the pressurized medium, a third valve provided in the eighth hydraulic flow path to control the flow of the pressurized medium, a fourth valve provided in the ninth hydraulic flow path to control the flow of the pressurized medium, a fifth valve provided in the third hydraulic flow path to control the flow of the pressurized medium, a sixth valve provided in the sixth hydraulic flow path to control the flow of the pressurized medium, a seventh valve provided in the eleventh hydraulic flow path to control the flow of the pressurized medium, and an eighth valve provided in the twelfth hydraulic flow path to control the flow of the pressurized medium.

The first valve may be provided as a check valve that allows only the flow of the pressurized medium from the first pressure chamber toward the seventh hydraulic flow path, the second valve may be provided as a check valve that allows only the flow of the pressurized medium from the second pressure chamber toward the seventh hydraulic flow path, the third valve may be provided as a check valve that allows only the flow of the pressurized medium from the seventh hydraulic flow path toward the first hydraulic circuit, the fourth valve may be provided as a check valve that allows only the flow of the pressurized medium from the seventh hydraulic flow path toward the second hydraulic circuit, the seventh valve may be provided as a check valve that allows only the flow of the pressurized medium from the first hydraulic circuit toward the tenth hydraulic flow path, the eighth valve may be provided as a check valve that allows only the flow of the pressurized medium from the second hydraulic circuit toward the tenth hydraulic flow path, and the fifth valve and the sixth valve may be provided as solenoid valves that control the flow of the pressurized medium in both directions.

The electronic brake system may further include a first dump flow path to connect the first pressure chamber and the reservoir, a second dump flow path to connect the second pressure chamber and the reservoir, a first dump valve provided in the first dump flow path to control the flow of the pressurized medium in both directions, and a second dump valve provided in the second dump flow path to control the flow of the pressurized medium in both directions.

The electronic brake system may further include a first bypass flow path connected in parallel to the first dump valve on the first dump flow path, a second bypass flow path connected in parallel to the second dump valve on the second dump flow path, a first dump check valve provided in the first bypass flow path to allow only the flow of the pressurized medium from the reservoir toward the first pressure chamber, and a second dump check valve provided in the second bypass flow path to allow only the flow of the pressurized medium from the reservoir toward the second pressure chamber.

The integrated master cylinder may include a first master chamber and a second master chamber, and the electronic brake system may further include a first backup flow path to connect the first master chamber and the first hydraulic circuit, and a second backup flow path to connect the second master chamber and the second hydraulic circuit.

The first hydraulic circuit may include a first inlet valve and a second inlet valve to control the flow of the pressurized medium supplied to a first wheel cylinder and a second wheel cylinder, respectively; and a first outlet valve and a second outlet valve to control the flow of the pressurized medium discharged from the first wheel cylinder and the second wheel cylinder to the first backup flow path, respectively, the second hydraulic circuit may include a third inlet valve and a fourth inlet valve to control the flow of the pressurized medium supplied to a third wheel cylinder and a fourth wheel cylinder, respectively; and a third outlet valve and a fourth outlet valve to control the flow of the pressurized medium discharged from the third wheel cylinder and the fourth wheel cylinder to the reservoir, respectively, and the first backup flow path may be connected to at least one of a rear end of the first outlet valve and a rear end of the second outlet valve on the first hydraulic circuit.

The second backup flow path may be connected to at least one of a rear end of the third inlet valve and a rear end of the fourth inlet valve on the second hydraulic circuit.

The electronic brake system may further include a cut valve provided in the second backup flow path to control the flow of the pressurized medium.

The electronic brake system may further include a reservoir flow path to connect the integrated master cylinder and the reservoir, wherein the reservoir flow path may further include a first reservoir flow path to communicate the reservoir and the first master chamber, and a second reservoir flow path to communicate the reservoir and the second master chamber.

An aspect of the present disclosure provides an operation method of the electronic brake system may include performing a normal operation mode in which as the hydraulic pressure transferred from the hydraulic pressure supply device to the wheel cylinders gradually increases, a first braking mode in which the hydraulic pressure is primarily provided, a second braking mode in which the hydraulic pressure is secondly provided, and a third braking mode in which the hydraulic pressure is thirdly provided are sequentially performed.

In the first braking mode, the hydraulic pressure generated in the first pressure chamber by the forward movement of the hydraulic piston may be provided to the first hydraulic circuit and the second hydraulic circuit through the hydraulic control unit, respectively.

In the second braking mode, the hydraulic pressure generated in the second pressure chamber by the backward movement of the hydraulic piston after the first braking mode may be provided to the first hydraulic circuit and the second hydraulic circuit through the hydraulic control unit, respectively.

In the third braking mode, a part of the hydraulic pressure generated in the first pressure chamber by the forward movement of the hydraulic piston after the second braking mode may be provided to the first hydraulic circuit and the second hydraulic circuit through the hydraulic control unit, respectively, and the remaining part of the hydraulic pressure generated in the first pressure chamber may be supplied to the second pressure chamber through the hydraulic control unit.

Advantageous Effects

An electronic brake system and an operation method thereof according to the present embodiment can reduce the number of components and implement product miniaturization and weight reduction.

The electronic brake system and the operation method thereof according to the present embodiment can implement stable and effective braking in various operating situations of a vehicle.

The electronic brake system and the operation method thereof according to the present embodiment can stably generate a high braking pressure.

The electronic brake system and the operation method thereof according to the present embodiment can improve performance and operational reliability of a product.

The electronic brake system and the operation method thereof according to the present embodiment can stably provide a braking pressure even in case of a breakdown of components or leakage of a pressurized medium.

The electronic brake system and the operation method thereof according to the present embodiment can implement easy assembly of the product, improve productivity of the product and reducing a manufacturing cost of the product.

DESCRIPTION OF DRAWINGS

FIG. 1 is a hydraulic circuit diagram illustrating an electronic brake system according to the present embodiment.

FIG. 2 is an enlarged view illustrating an integrated master cylinder, a reservoir and a reservoir flow path in the electronic brake system according to the present embodiment, and an enlarged cross-sectional view of a simulation piston.

FIG. 3 is a hydraulic circuit diagram illustrating that the electronic brake system according to the present embodiment performs a first braking mode.

FIG. 4 is a hydraulic circuit diagram illustrating that the electronic brake system according to the present embodiment performs a second braking mode.

FIG. 5 is a hydraulic circuit diagram illustrating that the electronic brake system according to the present embodiment performs a third braking mode.

FIG. 6 is a hydraulic circuit diagram illustrating that the electronic brake system according to the present embodiment operates to release the third braking mode.

FIG. 7 is a hydraulic circuit diagram illustrating that the electronic brake system according to the present embodiment operates to release the second braking mode.

FIG. 8 is a hydraulic circuit diagram illustrating that the electronic brake system according to the present embodiment operates to release the first braking mode.

FIG. 9 is a hydraulic circuit diagram illustrating that the electronic brake system according to the present embodiment operates (fallback mode) in an abnormal state.

FIG. 10 is a hydraulic circuit diagram illustrating that the electronic brake system according to the present embodiment operates in an ABS dump mode.

FIG. 11 is a hydraulic circuit diagram illustrating that the electronic brake system according to the present embodiment operates in a diagnosis mode.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a hydraulic circuit diagram illustrating an electronic brake system 1 according to the present embodiment.

Referring to FIG. 1, the electronic brake system 1 according to the present embodiment includes a reservoir 30 to store a pressurized medium such as brake oil therein, an integrated master cylinder 20 to provide a reaction force corresponding to a pressing force of a brake pedal 10 to a driver and pressurize and discharge the pressurized medium accommodated therein, wheel cylinders 40 to perform braking of respective wheels RR, RL, FR, and FL by receiving a hydraulic pressure of the pressurized medium, a hydraulic pressure supply device 100 to receive an electrical signal corresponding to a pressing force of the driver from a pedal displacement sensor 11 detecting a displacement of the brake pedal 10 and to generate a hydraulic pressure of the pressurized medium through a mechanical operation, a hydraulic control unit 200 to control the hydraulic pressure to be transferred to the wheel cylinders 40, and an electronic control unit (ECU) (not shown) to control the hydraulic pressure supply device 100 and various valves based on hydraulic pressure information and pedal displacement information.

The integrated master cylinder 20 includes a simulation chamber 22a and a master chambers 23a and 24a to, when the driver presses the brake pedal 10 for braking operation, provide a reaction force against the pressing to the driver to provide a stable pedal feel, and at the same time pressurize and discharge the pressurized medium accommodated therein.

FIG. 2 is an enlarged view illustrating the integrated master cylinder 20, the reservoir 30 and a reservoir flow path 60 in the electronic brake system 1 according to the present embodiment, and an enlarged cross-sectional view of a simulation piston 22.

Referring to FIGS. 1 and 2, the integrated master cylinder 20 may be divided into a pedal simulation part to provide a pedal feel to the driver, and a master cylinder part to supply and receive the pressurized medium to and from the reservoir 30 and wheel cylinders. The integrated master cylinder 20 may be configured such that the pedal simulation part and the master cylinder part are sequentially provided from the brake pedal 10 side and disposed coaxially within one cylinder block 21.

Specifically, the integrated master cylinder 20 includes the cylinder block 21 having a chamber formed therein, the simulation chamber 22a formed on an inlet side of the cylinder block 21 to which the brake pedal 10 is connected, the simulation piston 22 provided in the simulation chamber 22a and connected to the brake pedal 10 to be displaceable depending on the operation of the brake pedal 10, the first master chamber 23a, a first master piston 23 provided in the first master chamber 23a and provided to be displaceable by a displacement of the simulation piston 22 or by a hydraulic pressure generated in the simulation chamber 22a depending on the displacement of the simulation piston 22, the second master chamber 24a, a second master piston 24 provided in the second master chamber 24a and provided to be displaceable by a displacement of the first master piston 23 or by a hydraulic pressure generated in the first master chamber 23a depending on the displacement of the first master piston 23, an elastic member 25 provided between the simulation piston 22 and the first master piston 23 to provide a pedal feel through an elastic restoring force generated during compression, a simulator spring 22b to elastically support the simulation piston 22, a first piston spring 23b to elastically support the first master piston 23, and a second piston spring 24b to elastically support the second master piston 24.

The simulation chamber 22a, the first master chamber 23a, and the second master chamber 24a may be sequentially formed on the cylinder block 21 of the integrated master cylinder 20 from the brake pedal 10 side (the right side based on FIGS. 1 and 2) from the inside (the left side based on FIGS. 1 and 2). Also, the simulation piston 22, the first master piston 23, and the second master piston 24 are disposed in the simulation chamber 22a, the first master chamber 23a, and the second master chamber 24a, respectively, to pressurize the pressurized medium accommodated or generate negative pressure in the respective chambers according to forward or backward movement.

The simulation chamber 22a may be formed on the inlet side or the outermost side (the right side based on FIGS. 1 and 2) of the cylinder block 21, and the simulation piston 22 connected to an input rod of the brake pedal 10 may be accommodated in the simulation chamber 22a to enable reciprocating movement.

The pressurized medium may be introduced into and discharged from the simulation chamber 22a through a first hydraulic port 28a and a second hydraulic port 28b. The first hydraulic port 28a is connected to a simulation flow path 61, which will be described later, so that the pressurized medium may be introduced into the simulation chamber 22a from the reservoir 30, or conversely, the pressurized medium may be discharged to the reservoir 30 from the simulation chamber 22a, and the second hydraulic port 28b is connected to an auxiliary backup flow path 253, which will be described later, so that the pressurized medium may be introduced into the simulation chamber 22a from a first backup flow path 251, or conversely, the pressurized medium may be discharged to the first backup flow path 251 from the simulation chamber 22a.

The simulation chamber 22a may be assisted to be in communication with the reservoir 30 through an auxiliary hydraulic port 28g. By connecting an auxiliary reservoir flow path 65 to the auxiliary hydraulic port 28g, the flow of the pressurized medium between the simulation chamber 22a and the reservoir 30 may be assisted, a first sealing member 29a, which will be described later, is provided in front of the auxiliary hydraulic port 28g (on the left side based on FIGS. 1 and 2) so that supply of the pressurized medium from the auxiliary reservoir flow path 65 to the simulation chamber 22a may be allowed while flow of the pressurized medium in the opposite direction may be blocked, and a second sealing member 29b, which will be described later, is provided in the rear of the auxiliary reservoir flow path 65 (on the right side based on FIGS. 1 and 2) so that leakage of the pressurized medium from the simulation chamber 22a to the outside of the cylinder block 21 may be prevented.

The simulation piston 22 may be accommodated in the simulation chamber 22a to pressurize the pressurized medium accommodated in the simulation chamber 22a by moving forward (the left direction based on FIGS. 1 and 2) or to generate a negative pressure inside the simulation chamber 22a by moving backward (the right direction based on FIGS. 1 and 2).

The simulation piston 22 may include a piston body 26 having an assembly hole 26a formed therein, and a spring support 27 having a coupling protrusion 27c inserted into and fixed to the assembly hole 26a. An outer circumferential surface of the piston body 26 is in contact with an inner circumferential surface of the simulation chamber 22a so that the piston body 26 may pressurize the pressurized medium in the simulation chamber 22a or generate a negative pressure, and the assembly hole 26a is formed inside the piston body 26, and the coupling protrusion 27c of the spring support 27 is coupled to the assembly hole 26a so that the piston body 26 and the spring support 27 may be integrally assembled. To this end, a coupling groove (not shown) in which the coupling protrusion 27c is inserted may be formed on an inner circumferential surface of the assembly hole 26a.

The spring support 27 may include a coupling part 27a inserted into the assembly hole 26a and having the coupling protrusion 27c formed to protrude outward at an end thereof, and a support part 27b formed to extend outward so that one side of the simulator spring 22b is supported. The simulator spring 22b is supported on one surfaces of the coupling part 27a and the support part 27b and the input rod is supported on the other surfaces so that the coupling part 27a and the support part 27b may be operated in conjunction with the brake pedal 10. The other side of the simulator spring 22b may be supported on the cylinder block 21 of the integrated master cylinder 20, and a detailed description thereof will be described later. The spring support 27 may be formed in a hollow shape with an empty inside in order to implement easy assembly and reduce the weight of the product.

Because the simulation chamber 22a is in communication with the reservoir 30 through the simulation flow path 61 when a simulator valve 70, which will be described later, is opened, even when the simulation piston 22 moves forward, the pressurized medium accommodated in the simulation chamber 22a is not pressurized. However, because the simulation chamber 22a and the reservoir 30 are blocked when the simulator valve 70 is closed, the simulation chamber 22a is sealed so that the pressurized medium inside the simulation chamber 22a may be pressurized according to the forward movement of the simulation piston 22. A detailed description thereof will be described later.

The first master chamber 23a may be formed inside the simulation chamber 22a on the cylinder block 21 (the left side based on FIGS. 1 and 2), and the first master piston 23 may be accommodated in the first master chamber 23a to enable reciprocating movement.

The pressurized medium may be introduced into and discharged from the first master chamber 23a through a third hydraulic port 28c and a fourth hydraulic port 28d. The third hydraulic port 28c is connected to a first reservoir flow path 62, which will be described later, so that the pressurized medium may be introduced into the first master chamber 23a from the reservoir 30, or conversely, the pressurized medium may be discharged to the reservoir 30 from the first master chamber 23a, and the fourth hydraulic port 28d is connected to the first backup flow path 251, which will be described later, so that the pressurized medium may be introduced into the first master chamber 23a from a first hydraulic circuit, or conversely, the pressurized medium may be discharged to the first hydraulic circuit from the first master chamber 23a through the first backup flow path 251.

The first master piston 23 may be accommodated in the first master chamber 23a to pressurize the pressurized medium accommodated in the first master chamber 23a by moving forward or to generate a negative pressure inside the first master chamber 23a by moving backward. Specifically, as a volume of the first master chamber 23a decreases when the first master piston 23 moves forward, the pressurized medium present in the first master chamber 23a may be pressurized to generate a hydraulic pressure. Conversely, as the volume of the first master chamber 23a increases when the first master piston 23 moves backward, the pressurized medium present in the first master chamber 23a may be depressurized, and at the same time generate a negative pressure inside the first master chamber 23a.

When a front end (a left end based on FIGS. 1 and 2) of the first master piston 23 is disposed between a front side (the left side based on FIGS. 1 and 2) of a third sealing member 29c, which will be described later, and a rear side (the right side based on FIGS. 1 and 2) of a fourth sealing member 29d, the first master chamber 23a may be connected to the first reservoir flow path 62 through the third hydraulic port 28c, and in this section, even when the first master piston 23 moves forward, the inside of the first master chamber 23a and the reservoir 30 are in communication with each other, so that the pressurized medium is not pressurized. However, when the first master piston 23 continues to move forward and the front end of the first master piston 23 is disposed in the front of the fourth sealing member 29d, the first master chamber 23a may be blocked from the third hydraulic port 28c and the first reservoir flow path 62, and in this case, as the first master chamber 23a is sealed, the pressurized medium inside the first master chamber 23a may be pressurized.

The second master chamber 24a may be formed inside the first master chamber 23a (the left side base on FIGS. 1 and 2) on the cylinder block 21, and the second master piston 24 may be accommodated in the second master chamber 24a to enable reciprocating movement.

The pressurized medium may be introduced into and discharged to the second master chamber 24a through a fifth hydraulic port 28e and a sixth hydraulic port 28f. The fifth hydraulic port 28e is connected to a second reservoir flow path 63, which will be described later, so that the pressurized medium may be introduced into the second master chamber 24a from the reservoir 30, or conversely, the pressurized medium may be discharged to the reservoir 30 from the second master chamber 24a. and the sixth hydraulic port 28f is connected to a second backup flow path 252, which will be described later, so that the pressurized medium may be introduced into the second master chamber 24a from a second hydraulic circuit, or conversely, the pressurized medium may be discharged to the second hydraulic circuit from the second master chamber 24a through the second backup flow path 252.

The second master piston 24 may be accommodated in the second master chamber 24a to pressurize the pressurized medium accommodated in the second master chamber 24a by moving forward or to generate a negative pressure inside the second master chamber 24a by moving backward. Specifically, as a volume of the second master chamber 24a decreases when the second master piston 24 moves forward, the pressurized medium present in the second master chamber 24a may be pressurized to generate a hydraulic pressure. Conversely, as the volume of the second master chamber 24a increases when the second master piston 24 moves backward, the pressurized medium present in the second master chamber 24a may be depressurized, and at the same time generate a negative pressure inside the second master chamber 24a.

When a front end (a left end based on FIGS. 1 and 2) of the second master piston 24 is disposed between a front side (the left side based on FIGS. 1 and 2) of a fifth sealing member 29e, which will be described later, and a rear side (the right side based on FIGS. 1 and 2) of a sixth sealing member 29f, the second master chamber 24a may be connected to the second reservoir flow path 63 through the fifth hydraulic port 28e, and in this section, even when the second master piston 24 moves forward, the inside of the second master chamber 24a and the reservoir 30 are in communication with each other, so that the pressurized medium is not pressurized. However, when the second master piston 24 continues to move forward and the front end of the second master piston 24 is disposed in the front of the sixth sealing member 29f, the second master chamber 24a may be blocked from the fifth hydraulic port 28e and the second reservoir flow path 63, and in this case, as the second master chamber 24a is sealed, the pressurized medium inside the second master chamber 24a may be pressurized. The integrated master cylinder 20 according to the present embodiment may secure safety in the event of a failure of a component by utilizing the simulation chamber 22a, the first master chamber 23a and the second master chamber 24a. For example, the simulation chamber 22a and the first master chamber 23a may be connected to any two wheels of a right front wheel FR, a left front wheel FL, a left rear wheel RL, and a right rear wheel RR of a vehicle through the first backup flow path 251, which will be described later, the second master chamber 24a may be connected to the other two wheels through the second backup flow path 252, and accordingly, even when a problem such as a leak occurs in any one of the chambers, it may be possible to brake the vehicle. A detailed description thereof will be described later.

The simulator spring 22b is provided to elastically support the simulation piston 22. The simulator spring 22b has one end supported by the cylinder block 21 and the other end supported by the support part 27b of the spring support 27, so that the simulation piston 22 may be elastically supported. As the brake pedal 10 operates, the simulation piston 22 is displaced, and at this time, the simulator spring 22b is compressed. Thereafter, when a pressing force of the brake pedal 10 is released, the simulator spring 22b is extended by its elastic force, and the simulation piston 22 may return to its original position.

The first piston spring 23b and the second piston spring 24b are provided to elastically support the first master piston 23 and the second master piston 24, respectively. To this end, the first piston spring 23b may be disposed between a front side of the first master piston 23 (the left end based on FIGS. 1 and 2) and a rear side of the second master piston 24 (the right end based on FIGS. 1 and 2), and the second piston spring 24b may be disposed between a front side of the second master piston 24 (the left end based on FIGS. 1 and 2) and an inner side surface of the cylinder block 21. When displacement occurs in the first master piston 23 and the second master piston 24 due to an operation such as braking, the first piston spring 23b and the second piston spring 24b are respectively compressed, and thereafter, when the operation such as braking is released, the first piston spring 23b and the second piston spring 24b are extended by their elastic forces, so that the first master piston 23 and the second master piston 24 may return to their original positions, respectively.

The elastic member 25 is disposed between the simulation piston 22 and the first master piston 23 and provided to provide a pedal feeling of the brake pedal 10 to the driver by its own elastic restoring force. The elastic member 25 may be made of a material such as compressible and expandable rubber, and when displacement occurs in the simulation piston 22 by the operation of the brake pedal 10, the elastic member 25 is compressed, and the driver may receive a stable and familiar pedal feel by an elastic restoring force of the compressed elastic member 25. A detailed description thereof will be described later.

The reservoir flow path 60 may include the simulation flow path 61 to connect the simulation chamber 22a and the reservoir 30, the first reservoir flow path 62 to connect the first master chamber 23a and the reservoir 30, the second reservoir flow path 63 to connect the second master chamber 24a and the reservoir 30, and the auxiliary reservoir flow path 65 to auxiliarly connect the simulation chamber 22a and the reservoir 30.

The simulation flow path 61 may be provided with the simulator valve 70 for controlling the flow in both directions of the pressurized medium delivered through the simulation flow path 61, and the simulator valve 70 may be provided as a normally closed type solenoid valve that operates to be opened when an electric signal is received from the electronic control unit in a normally closed state.

The reservoir flow path 60 may further include a reservoir bypass flow path 64 connected in parallel to the simulator valve 70 on the simulation flow path 61. To this end, both ends of the reservoir bypass flow path 64 may be connected to the front and rear sides of the simulator valve 70, respectively, and a simulator check valve 71 that allows only the flow of the pressurized medium from the reservoir 30 toward the simulation chamber 22a may be provided in the reservoir bypass flow path 64.

In the drawings, the several reservoirs 30 are shown and the reservoirs 30 are assigned the same reference numeral. The reservoirs 30 may be provided with the same or different components.

The integrated master cylinder 20 may include two of the sealing members 29a and 29b disposed before and after the auxiliary reservoir flow path 65, and a plurality of the sealing members 29c, 29d, 29e, and 29f disposed on the first reservoir flow path 62 and before and after of the second reservoir flow path 63, respectively. The sealing members 29 may be provided in a ring-shaped structure protruding from an inner wall of the integrated master cylinder 20 or outer circumferential surfaces of the simulation piston 22 and the master piston. Each of the sealing members 29 may be formed in a wedge shape or the like to allow only the flow of the pressurized medium from the reservoir 30 toward the simulation chamber 22a or the master chamber and block the flow of the pressurized medium in the opposite direction.

Explaining a pedal simulation operation by the integrated master cylinder 20, in a normal operation, the driver operates the brake pedal 10 and at the same time, a first cut valve 261 and a second cut valve 262 provided in the first backup flow path 251 and the second backup flow path 252, which will be described later, are each closed, and the simulator valve 70 of the simulation flow path 61 is opened. As the operation of the brake pedal 10 proceeds, the simulation piston 22 moves forward, but the first master chamber 23a and the second master chamber 24a are each closed by a closing operation of the first cut valve 261 and the second cut valve 262, and thus displacement of the first master piston 23 and the second master piston 24 is not generated. Therefore, the elastic member 25 is compressed by the displacement of the simulation piston 22, and an elastic restoring force by the compression of the elastic member 25 may be provided to the driver as a pedal feel. At this time, the pressurized medium accommodated in the simulation chamber 22a is delivered to the reservoir 30 through the simulation flow path 61. Thereafter, when the driver releases the pressing force of the brake pedal 10, as the simulator spring 22b and the elastic member 25 extend by their elastic forces, the simulation piston 22 returns to its original position, and the simulation chamber 22a may be filled with the pressurized medium supplied through the simulation flow path 61 and the reservoir bypass flow path 64.

As such, the inside of the simulation chamber 22a is always filled with the pressurized medium, when a pedal simulation is operated, the friction between the simulation piston 22 and the cylinder block 21 is minimized, thereby improving the durability of the integrated master cylinder 20 and preventing the inflow of foreign substances from the outside.

When the electronic brake system 1 operates abnormally, that is, in an operating state of a fallback mode, an operation of the integrated master cylinder 20 will be described later with reference to FIG. 9.

The hydraulic pressure supply device 100 is provided to receive an electrical signal corresponding to a pressing force of the driver from the pedal displacement sensor 11 detecting a displacement of the brake pedal 10 and to generate a hydraulic pressure of the pressurized medium through a mechanical operation.

The hydraulic pressure supply device 100 may include a hydraulic pressure providing unit 110 to provide pressure to the pressurized medium to be delivered to the wheel cylinders, a motor 120 to generate a rotational force by an electrical signal from the pedal displacement sensor 11, and a power transfer unit 130 to convert a rotational motion of the motor 120 into a linear motion to provide the linear motion to the hydraulic pressure providing unit 110.

The hydraulic pressure providing unit 110 includes a cylinder block 111 provided to accommodate the pressurized medium, a hydraulic piston 114 accommodated in the cylinder block 111, a sealing member 115 provided between the hydraulic piston 114 and the cylinder block 111 to seal the pressure chambers 112 and 113, and a drive shaft 133 to transfer power output from the power transfer unit 130 to the hydraulic piston 114.

The pressure chambers may include the first pressure chamber 112 located on the front side of the hydraulic piston 114 (the left direction of the hydraulic piston 114 based on FIGS. 1 and 2), and the second pressure chamber 113 located on the rear side of the hydraulic piston 114 (the right direction of the hydraulic piston 114 based on FIGS. 1 and 2). That is, the first pressure chamber 112 is provided to be partitioned by the cylinder block 111 and a front surface of the hydraulic piston 114 so that a volume thereof is varied depending on the movement of the hydraulic piston 114, and the second pressure chamber 113 is provided to be partitioned by the cylinder block 111 and a rear surface of the hydraulic piston 114 so that a volume thereof is varied depending on the movement of the hydraulic piston 114.

The first pressure chamber 112 is connected to a first hydraulic flow path 211, which will be described later, through a first communication hole formed on the cylinder block 111, and the second pressure chamber 113 is connected to a fourth hydraulic flow path 214, which will be described later, through a second communication hole formed on the cylinder block 111.

The sealing members include the piston sealing member 115 provided between the hydraulic piston 114 and the cylinder block 111 to seal between the first pressure chamber 112 and the second pressure chamber 113, and the drive shaft 133 sealing member provided between the drive shaft 133 and the cylinder block 111 to seal between the second pressure chamber 113 and the opening of the cylinder block 111.

The hydraulic pressure or negative pressure of the first pressure chamber 112 and the second pressure chamber 113 generated by the forward or backward movement of the hydraulic piston 114 may not leak by being sealed with the piston sealing member 115 and the drive shaft 133 sealing member and may be transferred to the first hydraulic flow path 211 and the fourth hydraulic flow path 214, which will be described later.

The first pressure chamber 112 and the second pressure chamber 113 are connected to the reservoir 30 by a first dump flow path 116 and a second dump flow path 117, and a first bypass flow path 118 and a second bypass flow path 119, respectively, and thus the first pressure chamber 112 and the second pressure chamber 113 may receive and accommodate the pressurized medium from the reservoir 30, or the pressurized medium in the first pressure chamber 112 or the second pressure chamber 113 may be delivered to the reservoir 30.

To this end, the first dump flow path 116 may be provided in communication with the first pressure chamber 112 by a third communication hole formed on the cylinder block 111 to be connected to the reservoir 30, and the second dump flow path 117 may be provided in communication with the second pressure chamber 113 by a fourth communication hole formed on the cylinder block 111 to be connected to the reservoir 30. In addition, the first bypass flow path 118 may be connected to rejoin after branching on the first dump flow path 116, and the second bypass flow path 119 may be connected to rejoin after branching on the second dump flow path 117.

A first dump valve 241 and a second dump valve 242 for controlling the flow of the pressurized medium may be provided in the first dump flow path 116 and the second dump flow path 117, respectively. Referring again to FIG. 1, the first dump valve 241 may be provided as a two-way solenoid valve that controls the flow of the pressurized medium between the first pressure chamber 112 and the reservoir 30, and the second dump valve 242 may be provided as a two-way solenoid valve that controls the flow of the pressurized medium between the second pressure chamber 113 and the reservoir 30. The first dump valve 241 may be provided as a normally closed type solenoid valve that operates to be opened when an electric signal is received from the electronic control unit in a normally closed state, and the second dump valve 242 may be provided as a normally open type solenoid valve that operates to be closed when an electric signal is received from the electronic control unit in a normally open state.

The first bypass flow path 118 is connected to the first dump flow path 116 to be parallel to the first dump valve 241, and a first dump check valve 243 for controlling the flow of the pressurized medium between the first pressure chamber 112 and the reservoir 30 may be provided in the first bypass flow path 118. In other words, the first bypass flow path 118 may be connected by bypassing the front side and the rear side of the first dump valve 241 on the first dump flow path 116, and the first dump check valve 243 may be provided to allow only the flow of the pressurized medium from the reservoir 30 toward the first pressure chamber 112 and to block the flow of the pressurized medium in the opposite direction.

Also, the second bypass flow path 119 is connected to the second dump flow path 117 to be parallel to the second dump valve 242, and a second dump check valve 244 for controlling the flow of the pressurized medium between the second pressure chamber 113 and the reservoir 30 may be provided in the second bypass flow path 119. In other words, the second bypass flow path 119 may be connected by bypassing the front side and the rear side of the second dump valve 242 on the second dump flow path 117, and the second dump check valve 244 may be provided to allow only the flow of the pressurized medium from the reservoir 30 toward the second pressure chamber 113 and to block the flow of the pressurized medium in the opposite direction.

The motor 120 is provided to generate a driving force by an electrical signal output from the electronic control unit (ECU). The motor 120 may include a stator and a rotor, and through this, may provide power to generate displacement of the hydraulic piston 114 by rotating in a forward or reverse direction. A rotational angular speed and a rotational angle of the motor 120 may be precisely controlled by a motor control sensor MPS. Because the motor 120 is a well-known technology, a detailed description will be omitted.

The power transfer unit 130 is provided to convert a rotational force of the motor 120 into a linear motion. The power transfer unit 130 may be provided as a structure including, for example, a worm shaft 131, a worm wheel 132 and the drive shaft 133.

The worm shaft 131 may be integrally formed with a rotation shaft of the motor 120 and may rotate the worm wheel 132 by having a worm formed on an outer circumferential surface thereof to be engaged with the worm wheel 132. The worm wheel 132 may linearly move the drive shaft 133 by being connected to be engaged with the drive shaft 133, and the drive shaft 133 is connected to the hydraulic piston 114, through which the hydraulic piston 114 may be slidably moved within the cylinder block 111.

Explaining the above operations again, when the displacement of the brake pedal 10 is detected by the pedal displacement sensor 11, the detected signal is transferred to the electronic control unit, and the electronic control unit drives the motor 120 to rotate the worm shaft 131 in one direction. The rotational force of the worm shaft 131 is transferred to the drive shaft 133 via the worm wheel 132, and the hydraulic piston 114 connected to the drive shaft 133 moves forward within the cylinder block 111, thereby generating a hydraulic pressure in the first pressure chamber 112.

Conversely, when the pressing force of the brake pedal 10 is released, the electronic control unit drives the motor 120 to rotate the worm shaft 131 in the opposite direction. Accordingly, the worm wheel 132 also rotates in the opposite direction, and the hydraulic piston 114 connected to the drive shaft 133 moves backward in the cylinder block 111, thereby generating a negative pressure in the first pressure chamber 112.

The generation of hydraulic pressure and negative pressure in the second pressure chamber 113 may be implemented by operating opposite to the above operations. That is, when the displacement of the brake pedal 10 is detected by the pedal displacement sensor 11, the detected signal is transferred to the electronic control unit, and the electronic control unit drives the motor 120 to rotate the worm shaft 131 in the opposite direction. The rotational force of the worm shaft 131 is transferred to the drive shaft 133 via the worm wheel 132, and the hydraulic piston 114 connected to the drive shaft 133 moves backward within the cylinder block 111, thereby generating a hydraulic pressure in the second pressure chamber 113.

Conversely, when the pressing force of the brake pedal 10 is released, the electronic control unit drives the motor 120 to rotate the worm shaft 131 in one direction. Accordingly, the worm wheel 132 also rotates in one direction, and the hydraulic piston 114 connected to the drive shaft 133 moves forward in the cylinder block 111, thereby generating a negative pressure in the second pressure chamber 113.

As such, the hydraulic pressure supply device 100 may generate a hydraulic pressure or negative pressure in the first pressure chamber 112 and the second pressure chamber 113, respectively, depending on the rotation direction of the worm shaft 131 by the operation of the motor 120, and whether a hydraulic pressure is transferred to the chambers to perform braking, or whether a negative pressure is generated in the chambers to release braking may be determined by controlling the valves. A detailed description thereof will be described later.

The power transfer unit 130 according to the present embodiment is not limited to any one structure as long as it may convert the rotational motion of the motor 120 into the linear motion of the hydraulic piston 114, and may include devices having various structures and manners.

The hydraulic control unit 200 may be provided to control a hydraulic pressure transferred to the wheel cylinders, and the electronic control unit (ECU) is provided to control the hydraulic pressure supply device 100 and various valves based on the hydraulic pressure information and pedal displacement information.

The hydraulic control unit 200 may include a first hydraulic circuit 201 for controlling the flow of hydraulic pressure transferred to first and second wheel cylinders 41 and 42 among the four wheel cylinders, and a second hydraulic circuit 202 for controlling the flow of hydraulic pressure transferred to third and fourth wheel cylinders 43 and 44, and includes a plurality of flow paths and valves to control the hydraulic pressure transferred from the integrated master cylinder 20 and the hydraulic pressure supply device 100 to the wheel cylinders 40.

Hereinafter, the hydraulic control unit 200 will be described with reference to FIG. 1 again.

Referring to FIG. 1, the first hydraulic flow path 211 is provided to be in communication with the first pressure chamber 112 and may be branched into a second hydraulic flow path 212 and a third hydraulic flow path 213. Also, the fourth hydraulic flow path 214 is provided to be in communication with the second pressure chamber 113 and may be branched into a fifth hydraulic flow path 215 and a sixth hydraulic flow path 216.

A first valve 231 for controlling the flow of the pressurized medium may be provided in the second hydraulic flow path 212. The first valve 231 may be provided as a check valve that allows only the flow of the pressurized medium discharged from the first pressure chamber 112 and blocks the flow of the pressurized medium in the opposite direction. That is, the first valve 231 may allow the hydraulic pressure generated in the first pressure chamber 112 to be transferred to the first hydraulic circuit 201 and the second hydraulic circuit 202 while blocking the pressurized medium flowing in the opposite direction from leaking to the first pressure chamber 112 through the second hydraulic flow path 212.

A second valve 232 for controlling the flow of the pressurized medium may be provided in the fifth hydraulic flow path 215. The second valve 232 may be provided as a check valve that allows only the flow of the pressurized medium in a direction of being discharged from the second pressure chamber 113 and blocks the flow of the pressurized medium in the opposite direction. That is, the second valve 232 may allow the hydraulic pressure generated in the second pressure chamber 113 to be transferred to the first hydraulic circuit 201 and the second hydraulic circuit 202 while preventing the pressurized medium flowing in the opposite direction from leaking to the second pressure chamber 113 through the fifth hydraulic flow path 215.

A seventh hydraulic flow path 217 may be provided by joining the second hydraulic flow path 212 and the fifth hydraulic flow path 215, and an eighth hydraulic flow path 218 and a ninth hydraulic flow path 219 may be provided by branching from the seventh hydraulic flow path 217 toward the first hydraulic circuit 201 and the second hydraulic circuit 202, respectively.

A third valve 233 and a fourth valve 234 for controlling the flow of the pressurized medium may be provided in the eighth hydraulic flow path 218 and the ninth hydraulic flow path 219, respectively. The third valve 233 may be provided as a check valve that allows only the flow of the pressurized medium from the seventh hydraulic flow path 217 toward the first hydraulic circuit 201 and blocks the flow of the pressurized medium in the opposite direction. That is, the third valve 233 allows the hydraulic pressure to be transferred from the seventh hydraulic flow path 217 to the first hydraulic circuit 201 while preventing the hydraulic pressure from leaking from the first hydraulic circuit 201 to the seventh hydraulic flow path 217. Likewise, the fourth valve 234 may be provided as a check valve that allows only the flow of the pressurized medium from the seventh hydraulic flow path 217 toward the second hydraulic circuit 202 and blocks the flow of the pressurized medium in the opposite direction. Accordingly, the fourth valve 234 may allow the hydraulic pressure to be transferred from the seventh hydraulic flow path 217 to the second hydraulic circuit 202 while preventing the hydraulic pressure from leaking from the second hydraulic circuit 202 to the seventh hydraulic flow path 217.

A tenth hydraulic flow path 220 may be provided by joining the third hydraulic flow path 213 and the sixth hydraulic flow path 216, and an eleventh hydraulic flow path 221 and a twelfth hydraulic flow path 222 are branched from the tenth hydraulic flow path 220 and may be connected to the first hydraulic circuit 201 and the second hydraulic circuit 202, respectively.

A fifth valve 235 for controlling the flow of the pressurized medium may be provided in the third hydraulic flow path 213. The fifth valve 235 may be provided as a two-way control valve that controls the flow of the pressurized medium delivered along the third hydraulic flow path 213. The fifth valve 235 may be provided as a normally closed type solenoid valve that operates to be opened when an electric signal is received from the electronic control unit in a normally closed state.

A sixth valve 236 for controlling the flow of the pressurized medium may be provided in the sixth hydraulic flow path 216. The sixth valve 236 may be provided as a two-way control valve that controls the flow of the pressurized medium delivered along the sixth hydraulic flow path 216. The sixth valve 236 may be provided as a normally closed type solenoid valve that operates to be opened when an electric signal is received from the electronic control unit in a normally closed state.

A seventh valve 237 and an eighth valve 238 for controlling the flow of the pressurized medium may be provided in the eleventh hydraulic flow path 221 and the twelfth hydraulic flow path 222, respectively. The seventh valve 237 may be provided as a check valve that allows only the flow of the pressurized medium from the first hydraulic circuit 201 toward the tenth hydraulic flow path 220 and blocks the flow of the pressurized medium in the opposite direction. That is, the seventh valve 237 may allow hydraulic pressure to be released from the first hydraulic circuit 201 to the tenth hydraulic flow path 220 while preventing the hydraulic pressure from being transferred from the first pressure chamber 112 or the second pressure chamber 113 to the first hydraulic circuit 201. Likewise, the eighth valve 238 may be provided as a check valve that allows only the flow of the pressurized medium from the second hydraulic circuit 202 toward the tenth hydraulic flow path 220 and blocks the flow of the pressurized medium in the opposite direction. Accordingly, the eighth valve 238 may allow the hydraulic pressure to be released from the second hydraulic circuit 202 to the tenth hydraulic flow path 220 while preventing the hydraulic pressure from being transferred from the first pressure chamber 112 or the second pressure chamber 113 to the second hydraulic circuit 202.

By the arrangement of the hydraulic flow paths and valves as described above, the hydraulic pressure formed in the first pressure chamber 112 according to the forward movement of the hydraulic piston 114 may be transferred to the first hydraulic circuit 201 by sequentially passing through the first hydraulic flow path 211, the second hydraulic flow path 212, the seventh hydraulic flow path 217, and the eighth hydraulic flow path 218, and may be transferred to the second hydraulic circuit 202 by sequentially passing through the first hydraulic flow path 211, the second hydraulic flow path 212, the seventh hydraulic flow path 217, and the ninth hydraulic flow path 219. Also, the hydraulic pressure formed in the second pressure chamber 113 according to the backward movement of the hydraulic piston 114 may be transferred to the first hydraulic circuit 201 by sequentially passing through the fourth hydraulic flow path 214, the fifth hydraulic flow path 215, the seventh hydraulic flow path 217, and the eighth hydraulic flow path 218, and may be transferred to the second hydraulic circuit 202 by sequentially passing through the fourth hydraulic flow path 214, the fifth hydraulic flow path 215, the seventh hydraulic flow path 217, and the ninth hydraulic flow path 219.

Conversely, the negative pressure generated in the first pressure chamber 112 according to the backward movement of the hydraulic piston 114 may recover the hydraulic pressure or pressurized medium in the first hydraulic circuit 201 and the second hydraulic circuit 202 to the first pressure chamber 112. Specifically, when the fifth valve 235 is opened, the hydraulic pressure in the first hydraulic circuit 201 may be transferred to the first pressure chamber 112 by sequentially passing through the eleventh hydraulic flow path 221, the tenth hydraulic flow path 220, the fifth hydraulic flow path 215, and the first hydraulic flow path 211, and the hydraulic pressure in the second hydraulic circuit 202 may be transferred to the first pressure chamber 112 by sequentially passing through the twelfth hydraulic flow path 222, the tenth hydraulic flow path 220, the fifth hydraulic flow path 215, and the first hydraulic flow path 211. Also, the negative pressure generated in the second pressure chamber 113 according to the forward movement of the hydraulic piston 114 may recover the hydraulic pressure or pressurized medium in the first hydraulic circuit 201 and the second hydraulic circuit 202 to the second pressure chamber 113.

Specifically, when the sixth valve 236 is opened, the hydraulic pressure in the first hydraulic circuit 201 may be transferred to the second pressure chamber 113 by sequentially passing through the eleventh hydraulic flow path 221, the tenth hydraulic flow path 220, the sixth hydraulic flow path 216, and the fourth hydraulic flow path 214, and the hydraulic pressure in the second hydraulic circuit 202 may be transferred to the second pressure chamber 113 by sequentially passing through the twelfth hydraulic flow path 222, the tenth hydraulic flow path 220, the sixth hydraulic flow path 216, and the fourth hydraulic flow path 214. A detailed description of the transfer and supply of hydraulic pressure by the arrangement of these hydraulic flow paths and valves will be described later with reference to FIGS. 3 to 11.

The first hydraulic circuit 201 of the hydraulic control unit 200 may control hydraulic pressure in the first and second wheel cylinders 41 and 42, which are two wheel cylinders among the four wheels RR, RL, FR, and FL, and the second hydraulic circuit 202 may control hydraulic pressure in the third and fourth wheel cylinders 43 and 44 which are the other two wheel cylinders.

The first hydraulic circuit 201 receives the hydraulic pressure through the eighth hydraulic flow path 218, and the eighth hydraulic flow path 218 may be provided to be branched into two flow paths connected to the first wheel cylinder 41 and the second wheel cylinder 42. Also, the first hydraulic circuit 201 discharges the hydraulic pressure through the eleventh hydraulic flow path 221, and may be provided by joining two flow paths from the first wheel cylinder 41 and the second wheel cylinder 42 toward the eleventh hydraulic flow path 221. The second hydraulic circuit 202 receives the hydraulic pressure from the hydraulic pressure supply device 100 through the ninth hydraulic flow path 219, and the ninth hydraulic flow path 219 may be provided to be branched into two flow paths connected to the third wheel cylinder 43 and the fourth wheel cylinder 44. Also, the second hydraulic circuit 202 discharges the hydraulic pressure through the twelfth hydraulic flow path 222, and may be provided by joining two flow paths from the third wheel cylinder 43 and the fourth wheel cylinder 44 toward the twelfth hydraulic flow path 222.

The first and second hydraulic circuits 201 and 202 may include first to fourth inlet valves 291 (291a, 291b, 291c, and 291d), respectively, to control the flow and hydraulic pressure of the pressurized medium transferred to the first to fourth wheel cylinders 40. The first to fourth inlet valves 291 are disposed on an upstream side of the first to fourth wheel cylinders 41, 42, 43, and 44, respectively, and may be provided as normally open type solenoid valves that operate to be closed when an electric signal is received from the electronic control unit in a normally open state.

The first and second hydraulic circuits 201 and 202 may include first to fourth check valves 293a, 293b, 293c, and 293d provided to be connected in parallel to the first to fourth inlet valves 291a, 291b, 291c, and 291d. The check valves 293a, 293b, 293c, and 293d may be provided in bypass flow paths to connect front and rear sides of the first to fourth inlet valves 291a, 291b, 291c, and 291d on the first and second hydraulic circuits 201 and 202, and may only allow the flow of the pressurized medium from the respective wheel cylinders to the hydraulic pressure providing unit 110 and may block the flow of the pressurized medium from the hydraulic pressure providing unit 110 to the wheel cylinders. The hydraulic pressure of the pressurized medium applied to the respective wheel cylinders may be quickly released by the first to fourth check valves 293a, 293b, 293c, and 293d, and even when the first to fourth inlet valves 291a, 291b, 291c, and 291d do not operate normally, the hydraulic pressure of the pressurized medium applied to the wheel cylinders may be smoothly returned to the hydraulic pressure providing unit 110.

The first hydraulic circuit 201 may include first and second outlet valves 292a and 292b connected to the first backup flow path 251 to improve performance when braking of the first and second wheel cylinders 41 and 42 is released. The first and second outlet valves 292a and 292b are connected to the first and second wheel cylinders 41 and 42, respectively, to control the flow of the pressurized medium discharged from the wheel cylinders. That is, the first and second outlet valves 292a and 292b may control depressurization of the wheel cylinders by being selectively opened when decompression braking such as an ABS dump mode is required by detecting the braking pressure of the first and second wheel cylinders 41 and 42. The pressurized medium discharged to the first backup flow path 251 through the first and second outlet valves 292a and 292b may be delivered to the reservoir 30 through the simulation chamber 22a and the simulation flow path 61. The first and second outlet valves 292a and 292b may be provided as normally open type solenoid valves that operate to be closed when an electric signal is received from the electronic control unit in a normally open state. Reference numerals 295 and 296 denote a bypass flow path 295 and a check valve 296 connected in parallel to the first outlet valve 292a for smooth connection between the first hydraulic circuit 201 and the first backup flow path 251.

The second hydraulic circuit 202 may include third and fourth outlet valves 292c and 292d directly connected to the reservoir 30 to improve performance when braking of the third and fourth wheel cylinders 43 and 44 is released. The third and fourth outlet valves 292c and 292d are connected to the third and fourth wheel cylinders 43 and 44, respectively, to control the flow of the pressurized medium discharged from the wheel cylinders 43 and 44. That is, the third and fourth outlet valves 292c and 292d may control depressurization of the wheel cylinders by being selectively opened when decompression braking such as the ABS dump mode is required by detecting the braking pressure of the third and fourth wheel cylinders 43 and 44. The third and fourth outlet valves 292c and 292d may be provided as normally closed type solenoid valves that operate to be opened when an electric signal is received from the electronic control unit in a normally closed state.

The electronic brake system 1 according to the present embodiment may include the first and second backup flow paths 251 and 252 capable of implementing braking by directly supplying the pressurized medium discharged from the integrated master cylinder 20 to the wheel cylinders when a normal operation is impossible due to a device failure or the like. A mode in which the hydraulic pressure in the integrated master cylinder 20 is directly transferred to the wheel cylinders is referred to as a fallback mode.

The first backup flow path 251 may be provided to connect the first master chamber 23a of the integrated master cylinder 20 and the first hydraulic circuit 201, and the second backup flow path 252 may be provided to connect the second master chamber 24a of the integrated master cylinder 20 and the second hydraulic circuit 202. The auxiliary backup flow path 253 may auxiliaryly connect the simulation chamber 22a and the first hydraulic circuit 201 by communicating the simulation chamber 22a and the first backup flow path 251.

Specifically, the first backup flow path 251 may be connected to at least one of rear ends of the first outlet valve 292a and the second outlet valve 292b on the first hydraulic circuit 201, and the second backup flow path 252 may be connected to at least one of rear ends of the third inlet valve 291c and the fourth inlet valve 291d on the second hydraulic circuit 202. FIG. 1 illustrates that the first backup flow path 251 is branched to be connected to the rear ends of the first outlet valve 292a and the second outlet valve 292b, respectively, and the second backup flow path 252 is connected to the rear end of the fourth inlet valve 291d, but the present disclosure is not limited thereto, and as long as the first backup flow path 251 is branched to be connected to at least one of the rear ends of the first outlet valve 292a and the second outlet valve 292b, and the second backup flow path 252 is connected to at least one of the rear ends of the third inlet valve 291c and the fourth inlet valve 291d, it should be understood to be the same.

The first backup flow path 251 may be provided with the first cut valve 261 for controlling the flow of the pressurized medium in both directions, and the second backup flow path 252 may be provided with the second cut valve 262 for controlling the flow of the pressurized medium in both directions. The first cut valve 261 and the second cut valve 262 may be provided as normally open type solenoid valves that operate to be closed when an electric signal is received from the electronic control unit in a normally open state.

Accordingly, when the first and second cut valves 261 and 262 are closed, the pressurized medium in the integrated master cylinder 20 may be prevented from being directly delivered to the wheel cylinders 40, and at the same time the hydraulic pressure provided from the hydraulic pressure supply device 100 may be supplied to the wheel cylinders through the hydraulic control unit 200, and when the first and second cut valves 261 and 262 are opened, the pressurized medium pressurized in the integrated master cylinder 20 may be directly supplied to the wheel cylinders 40 through the first and second backup flow paths 251 and 252, thereby performing braking.

The electronic brake system 1 according to the present embodiment may include a first pressure sensor PS1 to detect a hydraulic pressure in at least one of the first hydraulic circuit 201 and the second hydraulic circuit 202, and a second pressure sensor PS2 to detect a hydraulic pressure in the integrated master cylinder 20. The drawing illustrates that the first pressure sensor PS1 is provided in a front end of the inlet valve 291 of at least one of the first hydraulic circuit 201 and the second hydraulic circuit 202 to detect the hydraulic pressure of the pressurized medium applied to the first hydraulic circuit 201 and the second hydraulic circuit 202, and the second pressure sensor PS2 detects a hydraulic pressure of the pressurized medium generated in the first master chamber 23a, but the pressure sensors are not limited to the above positions and numbers, and as long as the hydraulic pressures in the hydraulic circuits 201 and 202 and the integrated master cylinder 20 may be detected, the pressure sensors may be provided in various positions and in various numbers.

Hereinafter, methods of operating the electronic brake system 1 according to the present embodiment will be described.

The operation of the electronic brake system 1 according to the present embodiment may perform a normal operation mode in which various devices and valves operate normally without failure or abnormality, an abnormal operation mode (fallback mode) in which various devices and valves operate abnormally by failure or malfunction, an ABS dump mode in which the hydraulic pressure in the wheel cylinder is rapidly and continuously decompressed for ABS operation, and a diagnostic mode for checking whether a leak occurs in the integrated master cylinder 20.

First, the normal operation mode among the operating methods of the electronic brake system 1 according to the present embodiment will be described.

The normal operation mode of the electronic brake system 1 according to the present embodiment may be divided into a first braking mode, a second braking mode, and a third braking mode as the hydraulic pressure transferred from the hydraulic pressure supply device 100 to the wheel cylinder increases. Specifically, in the first braking mode, the hydraulic pressure by the hydraulic pressure supply device 100 may be primarily provided to the wheel cylinder, in the second braking mode, the hydraulic pressure by the hydraulic pressure supply device 100 may be secondarily provided to the wheel cylinder to transfer a higher braking pressure than in the first braking mode, and in the third braking mode, the hydraulic pressure by the hydraulic pressure supply device 100 may be thirdly provided to the wheel cylinder to transfer the highest braking pressure.

The first to third braking modes may be changed by changing the operation of the hydraulic pressure supply device 100 and the hydraulic control unit 200. The hydraulic pressure supply device 100 may provide a sufficiently high hydraulic pressure without the high specification motor 120 by utilizing the first to third braking modes, and further, may prevent unnecessary loads applied to the motor 120. Therefore, a stable braking force may be secured while reducing the cost and weight of the brake system, and durability and operational reliability of the devices may be improved.

FIG. 3 is a hydraulic circuit diagram illustrating that the electronic brake system 1 according to the present embodiment performs a first braking mode.

Referring to FIG. 3, when the driver depresses the brake pedal 10 at the beginning of braking, the motor 120 operates to rotate in one direction, the rotational force of the motor 120 is transferred to the hydraulic pressure providing unit 110 by the power transfer unit 130, and the hydraulic piston 114 of the hydraulic pressure providing unit 110 moves forward, thereby generating a hydraulic pressure in the first pressure chamber 112. The hydraulic pressure discharged from the first pressure chamber 112 is transferred to each of the wheel cylinders 40 through the hydraulic control unit 200, the first hydraulic circuit 201 and the second hydraulic circuit 202, thereby generating a braking force.

Specifically, the hydraulic pressure generated in the first pressure chamber 112 is primarily transferred to the wheel cylinders 41 and 42 provided in the first hydraulic circuit 201 by sequentially passing through the first hydraulic flow path 211, the second hydraulic flow path 212, the seventh hydraulic flow path 217, and the eighth hydraulic flow path 218. At this time, the first inlet valve 291a and the second inlet valve 291b provided in the first hydraulic circuit 201 are provided in an open state, and the first outlet valve 292a and the second outlet valve 292b are maintained in a closed state to prevent leakage of hydraulic pressure.

The hydraulic pressure generated in the first pressure chamber 112 is primarily transferred to the wheel cylinders 43 and 44 provided in the second hydraulic circuit 202 by sequentially passing through the first hydraulic flow path 211, the second hydraulic flow path 212, the seventh hydraulic flow path 217, and the ninth hydraulic flow path 219. At this time, the third inlet valve 291c and the fourth inlet valve 291d provided in the second hydraulic circuit 202 are provided in an open state, and the third outlet valve 292c and the fourth outlet valve 292d are maintained in a closed state to prevent leakage of hydraulic pressure.

As described above, the first valve 231 allows the flow of the pressurized medium in the direction of being discharged from the first pressure chamber 112, so that the pressurized medium may be delivered from the first pressure chamber 112 to the seventh hydraulic flow path 217. Also, the third valve 233 allows the flow of the pressurized medium from the seventh hydraulic flow path 217 toward the first hydraulic circuit 201, and the fourth valve 234 allows the flow of the pressurized medium from the seventh hydraulic flow path 217 toward the second hydraulic circuit 202, so that in the first braking mode, the hydraulic pressure generated in the first pressure chamber 112 by the forward movement of the hydraulic piston 114 may be stably provided to the first hydraulic circuit 201 and the second hydraulic circuit 202. At this time, the first dump valve 241 may be maintained in a closed state, thereby preventing the hydraulic pressure generated in the first pressure chamber 112 from leaking to the reservoir 30.

In the first braking mode in which braking of the wheel cylinders 40 is performed by the hydraulic pressure supply device 100, the first cut valve 261 and the second cut valve 262 provided in the first backup flow path 251 and the second backup flow path 252, respectively, are closed, so that the pressurized medium discharged from the integrated master cylinder 20 is prevented from being delivered to the wheel cylinders 40 side. In addition, the simulator valve 70 provided in the simulation flow path 61 is opened so that the simulation chamber 22a and the reservoir 30 may be in communication with each other.

Specifically, because the first cut valve 261 and the second cut valve 262 are closed when a pressing force is applied to the brake pedal 10, the first master chamber 23a and the second master chamber 24a are sealed. Therefore, even when a pressing force is applied to the brake pedal 10, the first master piston 23 and the second master piston 24 are not displaced. On the other hand, because the simulator valve 70 is opened so that the simulation chamber 22a and the reservoir 30 are in communication with each other, the pressurized medium accommodated in the simulation chamber 22a is supplied to the reservoir 30 through the simulation flow path 61, and the simulation piston 22 smoothly moves forward by the pressing force of the brake pedal 10 to generate displacement. As such, as the simulation piston 22 moves forward in a state in which the position of the first master piston 23 is fixed, the elastic member 25 disposed between the simulation piston 22 and the first master piston 23 is compressed, and a reaction force corresponding to the pressing force of the brake pedal 10 acts by the elastic restoring force of the compressed elastic member 25, thereby providing a stable and proper pedal feel to the driver.

The electronic brake system 1 according to the present embodiment may switch from the first braking mode to the second braking mode illustrated in FIG. 4 when a higher braking pressure than in the first braking mode is provided.

FIG. 4 is a hydraulic circuit diagram illustrating that the electronic brake system 1 according to the present embodiment performs the second braking mode. Referring to FIG. 4, when the displacement of the brake pedal 10 detected by the pedal displacement sensor 11 is higher than a preset first displacement level or the hydraulic pressure detected by the flow path pressure sensor PS1 is higher than a preset first pressure level, the electronic control unit may switch from the first braking mode to the second braking mode by determining that a higher braking pressure is required.

When switching from the first braking mode to the second braking mode, the motor 120 operates to rotate in the other direction, and the rotational force of the motor 120 is transferred to the hydraulic pressure providing unit 110 by the power transfer unit 130 so that the hydraulic piston 114 moves backward, thereby generating a hydraulic pressure in the second pressure chamber 113. The hydraulic pressure discharged from the second pressure chamber 113 is transferred to each of the wheel cylinders 40 through the hydraulic control unit 200, the first hydraulic circuit 201, and the second hydraulic circuit 202 to generate a braking force.

Specifically, the hydraulic pressure generated in the second pressure chamber 113 is primarily transferred to the wheel cylinders 41 and 42 provided in the first hydraulic circuit 201 by sequentially passing through the fourth hydraulic flow path 214, the fifth hydraulic flow path 215, the seventh hydraulic flow path 217, and the eighth hydraulic flow path 218. At this time, the first inlet valve 291a and the second inlet valve 291b provided in the first hydraulic circuit 201 are provided in the open state, and the first outlet valve 292a and the second outlet valve 292b are maintained in the closed state to prevent leakage of hydraulic pressure.

Also, the hydraulic pressure generated in the second pressure chamber 113 is primarily transferred to the wheel cylinders 43 and 44 provided in the second hydraulic circuit 202 by sequentially passing through the fourth hydraulic flow path 214, the fifth hydraulic flow path 215, the seventh hydraulic flow path 217, and the ninth hydraulic flow path 219. At this time, the third inlet valve 291c and the fourth inlet valve 291d provided in the second hydraulic circuit 202 are provided in the open state, and the third outlet valve 292c and the fourth outlet valve 292d may be maintained in the closed state to prevent leakage of hydraulic pressure.

The second valve 232 allows the flow of the pressurized medium in the direction of being discharged from the second pressure chamber 113, so that the pressurized medium may be smoothly delivered from the second pressure chamber 113 to the seventh hydraulic flow path 217. Also, the third valve 233 allows the flow of the pressurized medium from the seventh hydraulic flow path 217 toward the first hydraulic circuit 201, and the fourth valve 234 allows the flow of the pressurized medium from the seventh hydraulic flow path 217 toward the second hydraulic circuit 202, so that in the second braking mode, the hydraulic pressure generated in the second pressure chamber 113 by the backward movement of the hydraulic piston 114 may be stably provided to the first hydraulic circuit 201 and the second hydraulic circuit 202. At this time, the second dump valve 242 is operated to be closed to prevent the hydraulic pressure generated in the second pressure chamber 113 from leaking to the reservoir 30, and at the same time, the first dump valve 241 is opened to supply the pressurized medium from the reservoir 30 to the first pressure chamber 112 so that the pressurized medium may be filled in the first pressure chamber 112.

Because the operation of the integrated master cylinder 20 in the second braking mode is the same as the operation of the integrated master cylinder 20 in the first braking mode described above, a description thereof is omitted to prevent duplication of content.

The electronic brake system 1 according to the present embodiment may switch from the second braking mode to the third braking mode illustrated in FIG. 5 when a higher braking pressure than in the second braking mode is provided.

FIG. 5 is a hydraulic circuit diagram illustrating that the electronic brake system 1 according to the present embodiment performs the third braking mode. Referring to FIG. 5, when the displacement of the brake pedal 10 detected by the pedal displacement sensor 11 is higher than a preset second displacement level or the hydraulic pressure detected by the flow path pressure sensor PS1 is higher than a preset second pressure level, the electronic control unit may switch from the second braking mode to the third braking mode by determining that a higher braking pressure is required.

When switching from the second braking mode to the third braking mode, the motor 120 operates to rotate in one direction again, and the rotational force of the motor 120 is transferred to the hydraulic pressure providing unit 110 by the power transfer unit 130 so that the hydraulic piston 114 moves forward, thereby generating a hydraulic pressure in the first pressure chamber 112. The hydraulic pressure discharged from the first pressure chamber 112 is transferred to each of the wheel cylinders 40 through the hydraulic control unit 200, the first hydraulic circuit 201, and the second hydraulic circuit 202 to generate a braking force.

Specifically, the hydraulic pressure generated in the first pressure chamber 112 is primarily transferred to the wheel cylinders 41 and 42 provided in the first hydraulic circuit 201 by sequentially passing through the first hydraulic flow path 211, the second hydraulic flow path 212, the seventh hydraulic flow path 217, and the eighth hydraulic flow path 218. At this time, the first inlet valve 291a and the second inlet valve 291b provided in the first hydraulic circuit 201 are provided in the open state, and the first outlet valve 292a and the second outlet valve 292b are maintained in the closed state to prevent leakage of hydraulic pressure.

Also, the hydraulic pressure generated in the first pressure chamber 112 is primarily transferred to the wheel cylinders 43 and 44 provided in the second hydraulic circuit 202 by sequentially passing through the first hydraulic flow path 211, the second hydraulic flow path 212, the seventh hydraulic flow path 217, and the ninth hydraulic flow path 219. At this time, the third inlet valve 291c and the fourth inlet valve 291d provided in the second hydraulic circuit 202 are provided in the open state, and the third outlet valve 292c and the fourth outlet valve 292d may be maintained in the closed state to prevent leakage of hydraulic pressure.

The second valve 232 allows the flow of the pressurized medium in the direction of being discharged from the second pressure chamber 113, so that the pressurized medium may be smoothly delivered from the second pressure chamber 113 to the seventh hydraulic flow path 217. Also, the third valve 233 allows the flow of the pressurized medium from the seventh hydraulic flow path 217 toward the first hydraulic circuit 201, and the fourth valve 234 allows the flow of the pressurized medium from the seventh hydraulic flow path 217 toward the second hydraulic circuit 202, so that in the third braking mode, the hydraulic pressure generated in the second pressure chamber 113 by the backward movement of the hydraulic piston 114 may be stably provided to the first hydraulic circuit 201 and the second hydraulic circuit 202. At this time, the second dump valve 242 may be maintained in a closed state to prevent the hydraulic pressure generated in the first pressure chamber 112 from leaking to the reservoir 30.

Because a high hydraulic pressure is provided, as the hydraulic piston 114 moves forward, the hydraulic pressure in the first pressure chamber 112 also increases the force to move the hydraulic piston 114 backward, a load applied to the motor 120 increases rapidly. Accordingly, in the third braking mode, the fifth valve 235 and the sixth valve 236 are opened to allow the flow of the pressurized medium through the third hydraulic flow path 213 and the sixth hydraulic flow path 216. In other words, a part of the hydraulic pressure generated in the first pressure chamber 112 may be supplied to the second pressure chamber 113 by sequentially passing through the first hydraulic flow path 211, the fifth hydraulic flow path 215, the sixth hydraulic flow path 216, and the fourth hydraulic flow path 214, and through this, the first pressure chamber 112 and the second pressure chamber 113 are in communication with each other to synchronize the hydraulic pressure, thereby reducing the load applied to the motor 120 and improving durability and reliability of devices. At this time, the second dump valve 242 is closed so that a negative pressure may be stably generated in the second pressure chamber 113 by the forward movement of the hydraulic piston 114, and a part of the hydraulic pressure generated in the first pressure chamber 112 may be quickly and smoothly transferred to the second pressure chamber 113.

Because the operation of the integrated master cylinder 20 in the third braking mode is the same as the operation of the integrated master cylinder 20 in the first braking mode described above, a description thereof is omitted to prevent duplication of content.

Hereinafter, a method of operating the electronic brake system 1 according to the present embodiment in which braking is released from the normal operation mode will be described.

FIG. 6 is a hydraulic circuit diagram illustrating that the hydraulic piston 114 of the electronic brake system 1 according to the present embodiment moves backward to release the third braking mode.

Referring to FIG. 6, when the pressing force applied to the brake pedal 10 is released, the motor 120 generates a rotational force in the other direction and transfers the rotational force to the power transfer unit 130, and the power transfer unit 130 moves the hydraulic piston 114 backward. Accordingly, the hydraulic pressure in the first pressure chamber 112 is released, and at the same time, a negative pressure may be generated, so that the pressurized medium in the wheel cylinders may be delivered to the first pressure chamber 112.

Specifically, the hydraulic pressure in the first and second wheel cylinders 41 and 42 provided in the first hydraulic circuit 201 is recovered to the first pressure chamber 112 by sequentially passing through the eleventh hydraulic flow path 221, the tenth hydraulic flow path 220, the third hydraulic flow path 213, and the first hydraulic flow path 211. At this time, the first inlet valve 291*a* and the second inlet valve 291*b* provided in the first hydraulic circuit 201 are provided in the open state, and the first outlet valve 292*a* and the second outlet valve 292*b* are maintained in the closed state to prevent the hydraulic pressure from leaking to the reservoir 30.

Also, the hydraulic pressure in the third and fourth wheel cylinders 43 and 44 provided in the second hydraulic circuit 202 by the negative pressure generated in the first pressure chamber 112 is recovered to the first pressure chamber 112 by sequentially passing through the twelfth hydraulic flow path 222, the tenth hydraulic flow path 220, the third hydraulic flow path 213, and the first hydraulic flow path 211. The third inlet valve 291*c* and the fourth inlet valve 291*d* provided in the second hydraulic circuit 202 are provided in the open state, and the third outlet valve 292*c* and the fourth outlet valve 292*d* are maintained in the closed state to prevent hydraulic pressure from leaking to the reservoir 30.

As described above, the seventh valve 237 allows the flow of the pressurized medium from the first hydraulic circuit 201 toward the tenth hydraulic flow path 220, and the eighth valve 238 allows the flow of the pressurized medium from the second hydraulic circuit 202 toward the tenth hydraulic flow path 220, so that the hydraulic pressure in the first hydraulic circuit 201 and the second hydraulic circuit 202 may be smoothly supplied to the tenth hydraulic flow path 220. Also, as the fifth valve 235 is opened when the third braking mode is released, the third hydraulic flow path 213 is opened, so that the hydraulic pressure transferred to the tenth hydraulic flow path 220 may be smoothly transferred to the first pressure chamber 112 through the third hydraulic flow path 213 and the first hydraulic flow path 211.

When the third braking mode is released, the hydraulic piston 114 moves backward, but a resistance against the backward movement of the hydraulic piston 114 occurs in a state in which the pressurized medium is accommodated in the second pressure chamber 113. Accordingly, when the third braking mode is released, the sixth valve 236 is also opened to communicate the first pressure chamber 112 and the second pressure chamber 113, so that the backward movement of the hydraulic piston 114 may be smoothly performed, and the pressurized medium accommodated in the second pressure chamber 113 may be recovered to the first pressure chamber 112 by sequentially passing through the fourth hydraulic flow path 214, the sixth hydraulic flow path 216, the third hydraulic flow path 213, and the first hydraulic flow path 211.

When the third braking mode is released, the second dump valve 242 may be switched to the closed state. As the second dump valve 242 is closed, the pressurized medium in the second pressure chamber 113 may be discharged only through the fourth hydraulic flow path 214 and supplied to the first pressure chamber 112. However, as necessary, the second dump valve 242 may be maintained in an open state so that the pressurized medium in the second pressure chamber 113 may be controlled to be introduced into the reservoir 30.

When the negative pressure generated in the first pressure chamber 112 is measured to be lower than a target pressure release value according to a degree of release of the pressing force of the brake pedal 10, at least one of the outlet valves 292 may be controlled to be opened to correspond to a target pressure value.

After the releasing of the third braking mode is completed, it may be switched to the releasing operation of the second braking mode illustrated in FIG. 7 in order to further lower the braking pressure of the wheel cylinders.

FIG. 7 is a hydraulic circuit diagram illustrating that the hydraulic piston 114 of the electronic brake system 1 according to the present embodiment moves forward to release the second braking mode.

Referring to FIG. 7, when the pressing force applied to the brake pedal 10 is released, the motor 120 generates a rotational force in one direction and transfers the rotational force to the power transfer unit 130, and the power transfer unit 130 moves the hydraulic piston 114 forward. Accordingly, the hydraulic pressure in the second pressure chamber 113 is released, and at the same time, a negative pressure may be generated, so that the pressurized medium in the wheel cylinders may be delivered to the second pressure chamber 113.

Specifically, the hydraulic pressure in the first and second wheel cylinders 41 and 42 provided in the first hydraulic circuit 201 is recovered to the second pressure chamber 113 by sequentially passing through the eleventh hydraulic flow path 221, the tenth hydraulic flow path 220, the sixth hydraulic flow path 216, and the fourth hydraulic flow path 214. At this time, the first inlet valve 291*a* and the second inlet valve 291*b* provided in the first hydraulic circuit 201 are provided in the open state, and the first outlet valve 292*a* and the second outlet valve 292*b* are maintained in the closed state to prevent the hydraulic pressure from leaking to the reservoir 30.

Also, the hydraulic pressure in the third and fourth wheel cylinders 43 and 44 provided in the second hydraulic circuit 202 by the negative pressure generated in the second pressure chamber 113 is recovered to the second pressure chamber 113 by sequentially passing through the twelfth hydraulic flow path 222, the tenth hydraulic flow path 220, the sixth hydraulic flow path 216, and the fourth hydraulic flow path 214. The third inlet valve 291*c* and the fourth inlet valve 291*d* provided in the second hydraulic circuit 202 are provided in the open state, and the third outlet valve 292*c* and the fourth outlet valve 292*d* are maintained in the closed state to prevent hydraulic pressure from leaking to the reservoir 30.

As described above, the seventh valve 237 allows the flow of the pressurized medium from the first hydraulic circuit 201 toward the tenth hydraulic flow path 220, and the eighth valve 238 allows the flow of the pressurized medium from the second hydraulic circuit 202 toward the tenth hydraulic flow path 220, so that the hydraulic pressure in the first hydraulic circuit 201 and the second hydraulic circuit 202 may be smoothly supplied to the tenth hydraulic flow path 220. Also, as the sixth valve 236 is opened when the second braking mode is released, the sixth hydraulic flow path 216 is opened, so that the hydraulic pressure transferred to the tenth hydraulic flow path 220 may be transferred to the second pressure chamber 113 through the sixth hydraulic flow path 216 and the fourth hydraulic flow path 214.

When the second braking mode is released, the second dump valve 242 may be switched to the closed state, and thus the second pressure chamber 113 and the reservoir 30 are disconnected, so that a negative pressure may be stably generated in the second pressure chamber 113. Also, when the second braking mode is released, the first dump valve 241 may be switched to the open state, and thus the pressurized medium accommodated in the first pressure chamber 112 is supplied to the reservoir 30 by the forward movement of the hydraulic piston 114, so that the forward movement of the hydraulic piston 114 may be performed smoothly.

When the negative pressure generated in the second pressure chamber 113 is measured to be lower than a target pressure release value according to a degree of release of the pressing force of the brake pedal 10, at least one of the outlet valves 292 may be controlled to be opened to correspond to a target pressure value.

After the releasing of the second braking mode is completed, it may be switched to the releasing operation of the first braking mode illustrated in FIG. 8 in order to completely release the braking pressure of the wheel cylinders.

FIG. 8 is a hydraulic circuit diagram illustrating that the hydraulic piston 114 of the electronic brake system 1 according to the present embodiment moves backward again to release the first braking mode.

Referring to FIG. 8, when the pressing force applied to the brake pedal 10 is released, the motor 120 generates a rotational force in the other direction and transfers the rotational force to the power transfer unit 130, and the power transfer unit 130 moves the hydraulic piston 114 backward. Accordingly, a negative pressure may be generated in the first pressure chamber 112, so that the pressurized medium in the wheel cylinders may be delivered to the first pressure chamber 112.

Specifically, the hydraulic pressure in the first and second wheel cylinders 41 and 42 provided in the first hydraulic circuit 201 is recovered to the first pressure chamber 112 by sequentially passing through the eleventh hydraulic flow path 221, the tenth hydraulic flow path 220, the third hydraulic flow path 213, and the first hydraulic flow path 211. At this time, the first inlet valve 291a and the second inlet valve 291b provided in the first hydraulic circuit 201 are provided in the open state, and the first outlet valve 292a and the second outlet valve 292b are maintained in the closed state to prevent the hydraulic pressure from leaking to the reservoir 30.

Also, the hydraulic pressure in the third and fourth wheel cylinders 43 and 44 provided in the second hydraulic circuit 202 by the negative pressure generated in the first pressure chamber 112 is recovered to the first pressure chamber 112 by sequentially passing through the twelfth hydraulic flow path 222, the tenth hydraulic flow path 220, the third hydraulic flow path 213, and the first hydraulic flow path 211. The third inlet valve 291c and the fourth inlet valve 291d provided in the second hydraulic circuit 202 are provided in the open state, and the third outlet valve 292c and the fourth outlet valve 292d are maintained in the closed state to prevent the hydraulic pressure from leaking to the reservoir 30.

The seventh valve 237 allows the flow of the pressurized medium from the first hydraulic circuit 201 toward the tenth hydraulic flow path 220, and the eighth valve 238 allows the flow of the pressurized medium from the second hydraulic circuit 202 toward the tenth hydraulic flow path 220, so that the hydraulic pressure in the first hydraulic circuit 201 and the second hydraulic circuit 202 may be smoothly supplied to the tenth hydraulic flow path 220. Further, when the first braking mode is released, the third hydraulic flow path 213 is opened as the fifth valve 235 is opened so that the hydraulic pressure delivered to the tenth hydraulic flow path 220 may be smoothly delivered to the first pressure chamber 112 through the third hydraulic flow path 213 and the first hydraulic flow path 211.

As the sixth valve 236 is maintained in a closed state and the second dump valve 242 is maintained in an open state, when the hydraulic piston 114 moves backward, the pressure medium in the second pressure chamber 113 may be supplied to the reservoir 30 along the second dump flow path 117.

When the negative pressure generated in the first pressure chamber 112 is measured to be lower than a target pressure release value according to a degree of release of the pressing force of the brake pedal 10, at least one of the outlet valves 292 may be controlled to be opened to correspond to a target pressure value.

Hereinafter, a description of an operation method in a case where the electronic brake system 1 according to the present embodiment does not operate normally, that is, in a fallback mode will be described.

FIG. 9 is a hydraulic circuit diagram showing the operation of the electronic brake system 1 according to the present embodiment in an abnormal operation mode (fallback mode) when a normal operation is impossible due to a device failure or the like.

Referring to FIG. 9, in the abnormal operation mode, each of the valves is controlled to be in an initial braking state which is a non-operating state. At this time, when the driver presses the brake pedal 10, the simulation piston 22 connected to the brake pedal 10 moves forward. Because the simulator valve 70 is in a closed state, the simulation chamber 22a is closed to move the first master piston 23 and the second master piston 24 forward without compressing the elastic member 25.

In the non-operating state, because the first cut valve 261 and the second cut valve 262 are maintained in an open state, the pressurized medium accommodated in the first master chamber 23a is delivered to the first hydraulic circuit 201 along the first backup flow path 251 by the forward movement of the first master piston 23, and the pressurized medium accommodated in the second master chamber 24a is delivered to the second hydraulic circuit 202 along the second backup flow path 252 by the forward movement of the second master piston 24, thereby performing braking of the wheel cylinders 40. The pressurized medium accommodated in the simulation chamber 22a may be supplied together to the first backup flow path 251 through the auxiliary backup flow path 253.

In the non-operating state, that is, in a state in which no electrical signal is received from the electronic control unit, because the first cut valve 261 and the second cut valve 262, and the first to fourth inlet valves 291 provided in the first and second hydraulic circuits 201 and 202 are in the open state, and the simulator valve 70 is in the closed state, the hydraulic pressure generated in the simulation chamber 22a, the first master chamber 23a, and the second master chamber 24a of the integrated master cylinder 20 may be directly delivered to the wheel cylinders 40, thereby improving the braking stability and performing quick braking.

Hereinafter, the ABS dump mode of the electronic brake system 1 according to the present embodiment will be described.

FIG. 10 is a hydraulic circuit diagram illustrating that the electronic brake system 1 according to the present embodiment operates in the ABS dump mode.

Referring to FIG. 10, when the ABS dump mode is to be performed while the hydraulic pressure providing unit 110 is operating for braking of the vehicle, the electronic control unit may be operated to control the operation of the outlet valve 292.

Specifically, as the hydraulic piston 114 of the hydraulic pressure providing unit 110 moves forward, a hydraulic pressure is generated in the first pressure chamber 112, and the hydraulic pressure in the first pressure chamber 112 is delivered to each of the wheel cylinders 40 through the hydraulic control unit 200, the first hydraulic circuit 201 and the second hydraulic circuit 202, thereby generating a braking force. Thereafter, when the ABS dump mode is to be performed, the electronic control unit repeatedly opens and closes the third outlet valve 292c and the fourth outlet valve 292d, so that the hydraulic pressure of the pressurized medium applied to the third wheel cylinder 43 and the fourth wheel cylinder 44 may be discharged directly to the reservoir 30. Also, the electronic control unit repeatedly opens and closes the first outlet valve 292a and the second outlet valve 292b, so that the hydraulic pressure of the pressurized medium applied to the first wheel cylinder 41 and the second wheel cylinder 42 may be released to the reservoir 30 by sequentially passing the first backup flow path 251, the auxiliary backup flow path 253, the simulation chamber 22a, and the simulation flow path 61.

Hereinafter, the diagnosis mode of the electronic brake system 1 according to the present embodiment will be described.

The electronic brake system 1 according to the present embodiment may perform the diagnostic mode for checking whether a leak occurs in the integrated master cylinder 20. FIG. 11 is a hydraulic circuit diagram illustrating that the electronic brake system 1 according to the present embodiment operates in the diagnosis mode. Referring to FIG. 11, when the diagnostic mode is performed, the electronic control unit controls to supply a hydraulic pressure generated from the hydraulic pressure supply device 100 to the master chamber of the integrated master cylinder 20.

Specifically, in a state in which each of the valves is controlled to be in the initial braking state which is a non-operating state, the electronic control unit operates to move the hydraulic piston 114 forward to generate a hydraulic pressure in the first pressure chamber 112, and at the same time, controls the first cut valve 261 and the second cut valve 262 to be in the closed state. The hydraulic pressure generated in the first pressure chamber 112 is transferred to the first hydraulic circuit 201 by sequentially passing the first hydraulic flow path 211, the third hydraulic flow path 213, the seventh hydraulic flow path 217, and the eighth hydraulic flow path 218, and the first outlet valve 292a and the second outlet valve 292b are maintained in a normally open state, so that the pressurized medium delivered to the first hydraulic circuit 201 is delivered to the simulation chamber 22a through the first backup flow path 251 and the auxiliary backup flow path 253. At this time, the simulator valve 70 is maintained in the closed state so that the simulation chamber 22a is provided in a sealed state.

In this state, by comparing a hydraulic pressure value of the pressurized medium expected to be generated by the displacement of the hydraulic piston 114 with an inner pressure of the integrated master cylinder 20 measured by the second pressure sensor PS2, a leak of the integrated master cylinder 20 may be diagnosed. Specifically, a hydraulic pressure value of the first pressure chamber 112 calculated and predicted based on a displacement amount of the hydraulic piston 114 or a rotational angle measured by the motor control sensor MPS is compared with an actual hydraulic pressure value of the integrated master cylinder 20 measured by the second pressure sensor PS2, and when the both hydraulic pressure values are the same, it may be determined that there is no leak in the integrated master cylinder 20. On the contrary, because when the hydraulic pressure value of the actual integrated master cylinder 20 measured by the second pressure sensor PS2 is lower than the hydraulic pressure value of the first pressure chamber 112 calculated and predicted based on the displacement amount of the hydraulic piston 114 or the rotational angle measured by the motor control sensor MPS, a part of the hydraulic pressure of the pressurized medium applied to the simulation chamber 22a is lost, it may be determined that a leak exists in the integrated master cylinder 20, and this may be notified to the driver.

The invention claimed is:

1. An electronic brake system comprising:
a reservoir in which a pressurized medium is stored;
an integrated master cylinder having a master chamber and a simulation chamber in which volumes thereof are varied depending on a displacement of a brake pedal;
a hydraulic pressure supply device configured to generate a hydraulic pressure by operating a hydraulic piston according to an electrical signal output in response to the displacement of the brake pedal and having a first pressure chamber formed on one side of the hydraulic piston and a second pressure chamber formed on the other side of the hydraulic piston; and
a hydraulic control unit comprising a first hydraulic circuit having two wheel cylinders and a second hydraulic circuit having the other two wheel cylinders and configured to control the hydraulic pressure transferred to the first hydraulic circuit and the second hydraulic circuit,
wherein the hydraulic control unit comprises:
a first hydraulic flow path connected to the first pressure chamber; a second hydraulic flow path and a third hydraulic flow path branched from the first hydraulic flow path; a fourth hydraulic flow path connected to the second pressure chamber; a fifth hydraulic flow path and a sixth hydraulic flow path branched from the fourth hydraulic flow path; a seventh hydraulic flow path in which the second hydraulic flow path and the fifth hydraulic flow path join; an eighth hydraulic flow path branched from the seventh hydraulic flow path and connected to the first hydraulic circuit; a ninth hydraulic flow path branched from the seventh hydraulic flow path and connected to the second hydraulic circuit; a tenth hydraulic flow path in which the third hydraulic flow path and the sixth hydraulic flow path join; an eleventh hydraulic flow path branched from the tenth hydraulic flow path and connected to the first hydraulic circuit; and a twelfth hydraulic flow path branched from the tenth hydraulic flow path and connected to the second hydraulic circuit.

2. The electronic brake system according to claim 1, wherein the hydraulic control unit further comprises:
a first valve provided in the second hydraulic flow path to control the flow of the pressurized medium; a second valve provided in the fifth hydraulic flow path to control the flow of the pressurized medium; a third valve provided in the eighth hydraulic flow path to control the flow of the pressurized medium; a fourth valve provided in the ninth hydraulic flow path to control the flow of the pressurized medium; a fifth valve provided in the third hydraulic flow path to control the flow of the pressurized medium; a sixth valve provided in the sixth hydraulic flow path to control the flow of the pressurized medium; a seventh valve provided in the eleventh hydraulic flow path to control the flow of the pressurized medium; and an eighth valve provided in the twelfth hydraulic flow path to control the flow of the pressurized medium.

3. The electronic brake system according to claim 2, wherein the first valve is provided as a check valve that allows only the flow of the pressurized medium from the first pressure chamber toward the seventh hydraulic flow path, the second valve is provided as a check valve that allows only the flow of the pressurized medium from the second pressure chamber toward the seventh hydraulic flow path, the third valve is provided as a check valve that allows only the flow of the pressurized medium from the seventh hydraulic flow path toward the first hydraulic circuit, the fourth valve is provided as a check valve that allows only the flow of the pressurized medium from the seventh hydraulic flow path toward the second hydraulic circuit, the seventh valve is provided as a check valve that allows only the flow of the pressurized medium from the first hydraulic circuit toward the tenth hydraulic flow path, the eighth valve is provided as a check valve that allows only the flow of the pressurized medium from the second hydraulic circuit toward the tenth hydraulic flow path, and the fifth valve and the sixth valve are provided as solenoid valves that control the flow of the pressurized medium in both directions.

4. The electronic brake system according to claim 2, wherein the integrated master cylinder comprises a first master chamber and a second master chamber, and
the electronic brake system further comprises:
a first backup flow path to connect the first master chamber and the first hydraulic circuit; and
a second backup flow path to connect the second master chamber and the second hydraulic circuit.

5. The electronic brake system according to claim 4, wherein the first hydraulic circuit comprises:
a first inlet valve and a second inlet valve to control the flow of the pressurized medium supplied to a first wheel cylinder and a second wheel cylinder, respectively; and a first outlet valve and a second outlet valve to control the flow of the pressurized medium discharged from the first wheel cylinder and the second wheel cylinder to the first backup flow path, respectively,
the second hydraulic circuit comprises:
a third inlet valve and a fourth inlet valve to control the flow of the pressurized medium supplied to a third wheel cylinder and a fourth wheel cylinder, respectively; and a third outlet valve and a fourth outlet valve to control the flow of the pressurized medium discharged from the third wheel cylinder and the fourth wheel cylinder to the reservoir, respectively, and
the first backup flow path is connected to at least one of a rear end of the first outlet valve and a rear end of the second outlet valve on the first hydraulic circuit.

6. The electronic brake system according to claim 5, wherein the second backup flow path is connected to at least one of a rear end of the third inlet valve and a rear end of the fourth inlet valve on the second hydraulic circuit.

7. The electronic brake system according to claim 6, further comprising a cut valve provided in the second backup flow path to control the flow of the pressurized medium.

8. The electronic brake system according to claim 4, further comprising a reservoir flow path to connect the integrated master cylinder and the reservoir,
wherein the reservoir flow path further comprises:
a first reservoir flow path to communicate the reservoir and the first master chamber; and a second reservoir flow path to communicate the reservoir and the second master chamber.

9. An operation method of the electronic brake system according to claim 2, comprising performing a normal operation mode in which as the hydraulic pressure transferred from the hydraulic pressure supply device to the wheel cylinders gradually increases, a first braking mode in which the hydraulic pressure is primarily provided, a second braking mode in which the hydraulic pressure is secondly provided, and a third braking mode in which the hydraulic pressure is thirdly provided are sequentially performed.

10. The operation method according to claim 9, wherein in the first braking mode, the hydraulic pressure generated in the first pressure chamber by the forward movement of the hydraulic piston is provided to the first hydraulic circuit and the second hydraulic circuit through the hydraulic control unit, respectively.

11. The operation method according to claim 10, wherein in the second braking mode, the hydraulic pressure generated in the second pressure chamber by the backward movement of the hydraulic piston after the first braking mode is provided to the first hydraulic circuit and the second hydraulic circuit through the hydraulic control unit, respectively.

12. The operation method according to claim 11, wherein in the third braking mode, a part of the hydraulic pressure generated in the first pressure chamber by the forward movement of the hydraulic piston after the second braking mode is provided to the first hydraulic circuit and the second hydraulic circuit through the hydraulic control unit, respectively, and
the remaining part of the hydraulic pressure generated in the first pressure chamber is supplied to the second pressure chamber through the hydraulic control unit.

13. The electronic brake system according to claim 1, further comprising:

a first dump flow path to connect the first pressure chamber and the reservoir;
a second dump flow path to connect the second pressure chamber and the reservoir;

a first dump valve provided in the first dump flow path to control the flow of the pressurized medium in both directions; and a second dump valve provided in the second dump flow path to control the flow of the pressurized medium in both directions.

14. The electronic brake system according to claim 13, further comprising:

a first bypass flow path connected in parallel to the first dump valve on the first dump flow path;

a second bypass flow path connected in parallel to the second dump valve on the second dump flow path;

a first dump check valve provided in the first bypass flow path to allow only the flow of the pressurized medium from the reservoir toward the first pressure chamber; and a second dump check valve provided in the second bypass flow path to allow only the flow of the pressurized medium from the reservoir toward the second pressure chamber.

* * * * *